United States Patent
Savoie et al.

(10) Patent No.: US 9,650,140 B2
(45) Date of Patent: May 16, 2017

(54) FLIGHT SUITS

(71) Applicant: STEPHAN/H, Québec (CA)

(72) Inventors: Nicole Savoie, Neuville (CA); Stephan Huot, Québec (CA)

(73) Assignee: STEPHAN/H, Québec (CA)

(*) Notice: Subject to any disclaimer, the term of this patent is extended or adjusted under 35 U.S.C. 154(b) by 0 days.

(21) Appl. No.: 15/103,728

(22) PCT Filed: Dec. 9, 2014

(86) PCT No.: PCT/CA2014/000887
§ 371 (c)(1),
(2) Date: Jun. 10, 2016

(87) PCT Pub. No.: WO2015/085405
PCT Pub. Date: Jun. 18, 2015

(65) Prior Publication Data
US 2016/0311533 A1 Oct. 27, 2016

Related U.S. Application Data

(60) Provisional application No. 61/915,222, filed on Dec. 12, 2013.

(51) Int. Cl.
A41D 13/02 (2006.01)
B64D 10/00 (2006.01)
A41D 13/00 (2006.01)

(52) U.S. Cl.
CPC ......... B64D 10/00 (2013.01); A41D 13/0002 (2013.01); A41D 13/02 (2013.01); A41D 2600/00 (2013.01)

(58) Field of Classification Search
CPC ..... A41D 13/0002; A41D 13/02; B64D 10/00
(Continued)

(56) References Cited

U.S. PATENT DOCUMENTS 3,086,214 A * 4/1963 Lash ...................... A41D 13/02
2/79
4,670,913 A * 6/1987 Morell ................... A41D 13/02
2/227
(Continued)

FOREIGN PATENT DOCUMENTS

| GB | 349095 | 5/1931 |
|---|---|---|
| WO | 2004039189 | 5/2004 |
| WO | 2008090329 | 7/2008 |

OTHER PUBLICATIONS

English Abstract of FR2738993A1, "Waterproof undergarment to be worn under flying suits such as a flying overall", published on Mar. 28, 1997.
(Continued)

Primary Examiner — Katherine Moran
(74) Attorney, Agent, or Firm — Bereskin & Parr LLP/S.E.N.C.R.L., s.r.l.

(57) ABSTRACT

There are provided flight suits that can be useful for helicopter pilots, airplane pilots, glider pilots etc. Pilots of such vessels have particular needs in terms of equipment and flight suits. The flight suits of the present disclosure allow, for example, for providing pilots with flight suits that are comfortable when worn in a sitting position. Moreover, these flight suits do not unduly restrict movement of the limbs when the pilot carries out various actions such as taking hold of headphones and reaching for the aircraft dashboard. For example, the flight suits can comprise a torso portion defining two arm openings; two shoulder portions that are extensible, each coupled to a different arm opening of the torso; two sleeves coupled each to a different shoulder portion, each sleeve optionally comprising an extensible elbow panel; and a lower portion comprising an extensible crotch portion and two leg portions.

18 Claims, 11 Drawing Sheets

(58) Field of Classification Search
USPC ................ 2/2.11, 2.14, 79, 69, 81, 456, 458
See application file for complete search history.

(56) References Cited

U.S. PATENT DOCUMENTS

| | | | |
|---|---|---|---|
| 5,033,123 A * | 7/1991 | Audet | A41D 13/02 |
| | | | 2/227 |
| 7,941,871 B1 | 5/2011 | Jorgensen | |
| 2002/0138893 A1 | 10/2002 | Culhane | |
| 2005/0210559 A1 | 9/2005 | Gabriele | |
| 2007/0289050 A1 | 12/2007 | Nocente et al. | |
| 2011/0302686 A1 * | 12/2011 | Chapuis | A41D 13/0015 |
| | | | 2/69 |

OTHER PUBLICATIONS

English Abstract of KR20100021148(A), "Flying Suit", published on Feb. 24, 2010.
Panoply, "Panoply Mach 5 Men's Coveralls", published in 2013.
"Place aux créneaux specialisé", http://groupehuot.com/place-aux-creneaux-specialises/, "Notre Histoire"; http:/www.stephanh.com/story, (Oct. 22, 2014).
English Abstract of FR2658702A1, "Garment with improved armhole", published on Aug. 30, 1991.
English Translation of FR2658702A1, "Garment with improved armhole", published on Aug. 30, 1991.

* cited by examiner

FLIGHT SUITS

CROSS-REFERENCE TO RELATED APPLICATIONS

The present disclosure is a 35 USC 371 national stage entry of PCT/CA2014/000887 filed on Dec. 9, 2014 and which claims priority on U.S. 61/915,222 filed on Dec. 12, 2013. These documents are hereby incorporated by reference in their entirety.

FIELD OF THE DISCLOSURE

The present disclosure relates to the field of equipment for pilots. In particular, the present disclosure relates to flight suits suitable for pilots of flying apparatuses or aircrafts. These flight suits are useful for helicopter pilots, airplane pilots, glider pilots etc.

BACKGROUND OF THE DISCLOSURE

Several suits are known in the art to be worn by aircraft pilots. However, several of them are either too hot to wear comfortably, too rigid to wear comfortably, and/or uncomfortable when worn in a sitting position. Furthermore, some of them unduly restrict movement of the limbs when the pilot carries out various actions such as taking hold of headphones and reaching for the aircraft dashboard.

SUMMARY OF THE DISCLOSURE

It would thus be highly desirable to be provided with an apparatus or a method that would at least partially solve one of the problems previously mentioned or that would be an alternative to the existing technologies.

According to one aspect, there is provided a flight suit comprising:
- a torso portion defining two arm openings;
- two shoulder portions that are effective for at least partially covering shoulder joint areas of the pilot, the shoulder portions being extensible, comprising each opposing first and second edges, and being each coupled to a different arm opening of the torso portion by means of their respective first edge, the two shoulder portions comprising each a stretch fabric that is more extensible in a weft direction than in a warp direction, the weft direction being generally transverse to their respective first and second edges;
- two sleeves coupled each to a different shoulder portion by means of the second edge of their respective shoulder portion, each sleeve optionally comprising an extensible elbow panel; and
- a lower portion optionally comprising an extensible crotch portion and two leg portions, each leg portion comprising an extensible inner panel effective for covering an inner region of each leg of the pilot, the inner region extending from the ankle up to at least one fifth of the height of the tibia of the pilot, said extensible inner panels comprising each a stretch fabric that is more extensible in a weft direction than in a warp direction, the weft direction being generally transverse to a longitudinal axis defined by each of the leg portions.

According to another aspect, there is provided a flight suit comprising:
- a torso portion defining two arm openings;
- two shoulder portions that are effective for at least partially covering shoulder joint areas of the pilot, the shoulder portions being extensible, comprising each opposing first and second edges, and being each coupled to a different arm opening of the torso portion by means of their respective first edge, the two shoulder portions comprising each a stretch fabric that is more extensible in a weft direction by at least 5% than in a warp direction, the weft direction being generally transverse to their respective first and second edges;
- two sleeves coupled each to a different shoulder portion by means of the second edge of their respective shoulder portion, each sleeve optionally comprising an extensible elbow panel; and
- a lower portion optionally comprising an extensible crotch portion and two leg portions, each leg portion comprising an extensible inner panel effective for covering an inner region of each leg of the pilot, the inner region extending from the ankle up to at least one fifth of the height of the tibia of the pilot, said extensible inner panels comprising each a stretch fabric that is more extensible in a weft direction by at least 5% than in a warp direction, the weft direction being generally transverse to a longitudinal axis defined by each of the leg portions.

According to another aspect, there is provided a flight suit comprising:
- a torso portion defining two arm openings;
- two shoulder portions that are effective for at least partially covering shoulder joint areas of the pilot, the shoulder portions being extensible, comprising each opposing first and second edges, and being each coupled to a different arm opening of the torso portion by means of their respective first edge, the two shoulder portions comprising each a stretch fabric that is more extensible in a weft direction by at least 10% than in a warp direction, the weft direction being generally transverse to their respective first and second edges;
- two sleeves coupled each to a different shoulder portion by means of the second edge of their respective shoulder portion, each sleeve optionally comprising an extensible elbow panel; and
- a lower portion optionally comprising an extensible crotch portion and two leg portions, each leg portion comprising an extensible inner panel effective for covering an inner region of each leg of the pilot, the inner region extending from the ankle up to at least one fifth of the height of the tibia of the pilot, said extensible inner panels comprising each a stretch fabric that is more extensible in a weft direction by at least 10% than in a warp direction, the weft direction being generally transverse to a longitudinal axis defined by each of the leg portions.

According to another aspect, there is provided a flight suit comprising:
- a torso portion defining two arm openings;
- two shoulder portions that are effective for at least partially covering shoulder joint areas of the pilot, the shoulder portions being extensible, comprising each opposing first and second edges, and being each coupled to a different arm opening of the torso portion by means of their respective first edge, the two shoulder portions comprising each a stretch fabric that is more extensible in a weft direction by at least 15% than in a warp direction, the weft direction being generally transverse to their respective first and second edges;
- two sleeves coupled each to a different shoulder portion by means of the second edge of their respective shoulder portion, each sleeve optionally comprising an extensible elbow panel; and a lower portion optionally comprising an extensible crotch portion and two leg portions, each leg portion comprising an extensible inner panel effective for covering an inner region of each leg of the pilot, the inner region extending from the ankle up to at least one fifth of the height of the tibia of the pilot, said extensible inner panels comprising each a stretch fabric that is more extensible in a weft direction by at least 15% than in a warp direction, the weft direction being generally transverse to a longitudinal axis defined by each of the leg portions.

According to another aspect, there is provided a flight suit comprising:

a torso portion defining two arm openings;

two shoulder portions that are effective for at least partially covering shoulder joint areas of the pilot, the shoulder portions being extensible, comprising each opposing first and second edges, and being each coupled to a different arm opening of the torso portion by means of their respective first edge, the two shoulder portions comprising each a stretch fabric that is extensible by at least 45% in a weft direction and by less than 45% in a warp direction, the weft direction being generally transverse to their respective first and second edges;

two sleeves coupled each to a different shoulder portion by means of the second edge of their respective shoulder portion, each sleeve optionally comprising an extensible elbow panel; and a lower portion optionally comprising an extensible crotch portion and two leg portions, each leg portion comprising an extensible inner panel effective for covering an inner region of each leg of the pilot, the inner region extending from the ankle up to at least one fifth of the height of the tibia of the pilot, said extensible inner panels comprising each a stretch fabric that is extensible by at least 45% in a weft direction and by less than 45% in a warp direction, the weft direction being generally transverse to a longitudinal axis defined by each of the leg portions.

According to another aspect there is provided a flight suit having a torso portion defining two arm openings, two shoulder portions that are effective for at least partially covering shoulder joint areas of the pilot, the shoulder portions being extensible, comprising each opposing first and second edges, and being each coupled to a different arm opening of the torso portion by means of their respective first edge, the two shoulder portions comprising each a stretch fabric that is extensible by at least 50% in a weft direction and by no more than 45% in a warp direction, the weft direction being generally transverse to their respective first and second edges, two sleeves coupled each to a different shoulder portion by means of the second edge of their respective shoulder portion, each sleeve optionally comprising an extensible elbow panel and a lower portion extending from a waist portion of the torso portion, the lower portion comprising an extensible crotch portion and two leg portions, each leg portion comprising an extensible inner panel effective for covering an inner region of each leg of the pilot, the inner region extending from the ankle up to at least one fifth of the height of the tibia of the pilot, said extensible inner panels comprising each a stretch fabric that is extensible by at least 50% in a weft direction and by no more than 45% in a warp direction, the weft direction being generally transverse to a longitudinal axis defined by each of the leg portions.

According to a further aspect there is provided a flight suit having a torso portion defining two arm openings, two sleeves coupled each to a different arm opening, a lower portion extending from a waist portion of the torso portion having an extensible lower back panel, and a breathable interior lining extending over an interior surface of at least a rear portion of the torso portion.

BRIEF DESCRIPTION OF THE DRAWINGS

The following drawings represent examples that are presented in a non-limitative manner.

DETAILED DESCRIPTION OF THE DISCLOSURE

Figure 1:
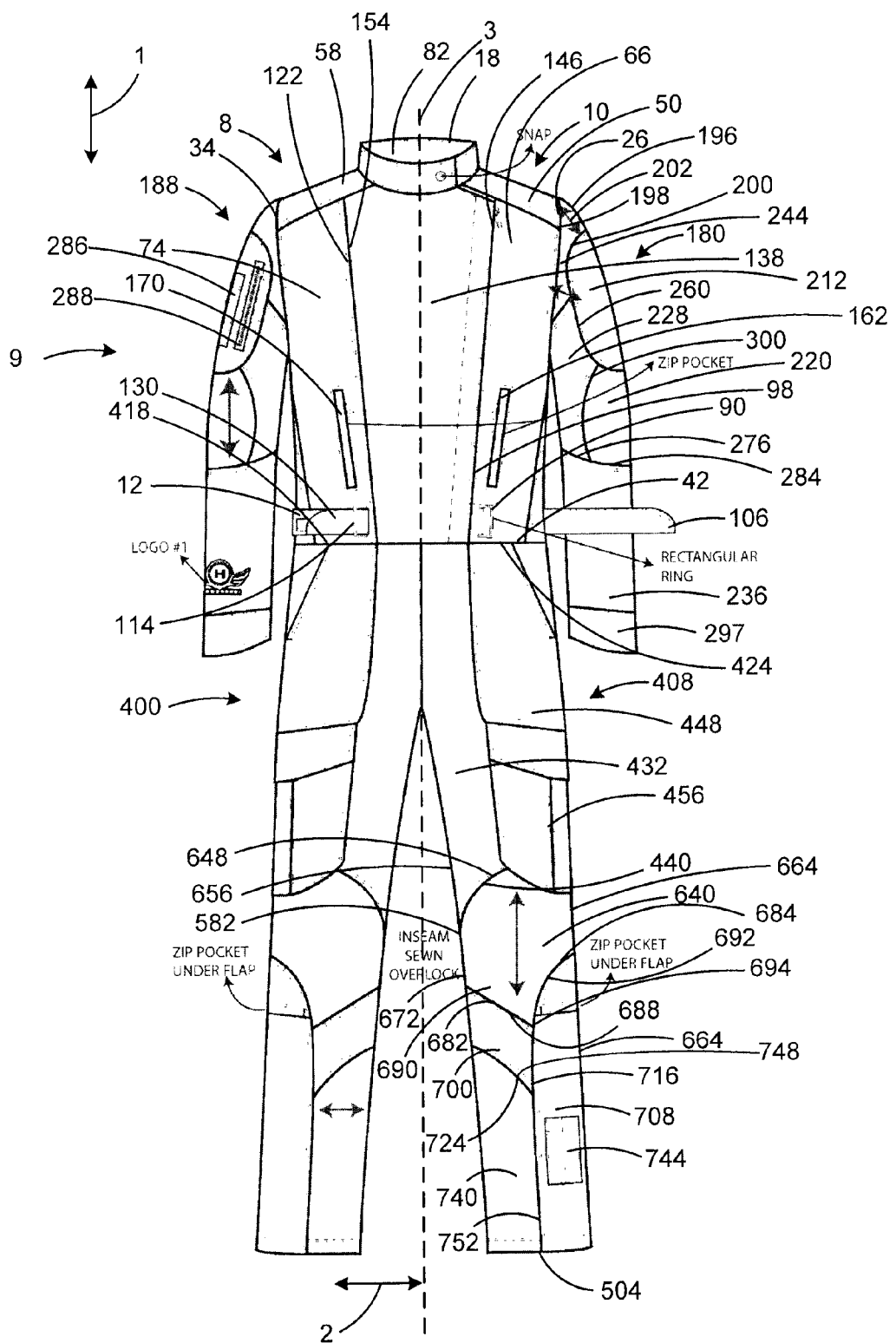
FIG. 1 illustrates a plan view of a front exterior of a flight suit according to various exemplary embodiments.

The following examples are presented in a non-limitative manner.

The expression "coupled" as used herein can have several different meanings depending on the context in which these terms are used. For example, the terms coupled or coupling can have a mechanical connotation. For example, as used herein, the terms coupled or coupling can indicate that two elements can be directly connected to one another or connected to one another through one or more intermediate elements or devices via a mechanical element. For example, with respect to fabrics, two fabric pieces may be coupled by sewing or other methods for joining fabric pieces known in the art.

The expression "front" as used herein with respect to a flight suit or any element thereof refers to a region of the flight suit or a region of that element that generally covers the frontside of the pilot (ex: face, chest, etc.) when the flight suit is worn.

The expression "rear" as used herein with respect to a flight suit or any element thereof refers to a region of the flight suit or a region of that element that generally covers the backside of the pilot (ex: back, buttocks, heels, etc.) when the flight suit is worn.

The expression "longitudinal" as used herein with respect to a flight suit refers to the two-way lengthwise direction of the flight suit. For example, the lengthwise direction corresponds to the direction used to measure the head-to-toe (or vice versa) height of a pilot when the flight suit is worn. For example, the longitudinal direction of the flight suit is generally denoted by a two-way arrow 1 in FIGS. 1 and 2.

The expression "lateral" as used herein with respect to a flight suit refers to the two-way widthwise direction of the flight suit and corresponds to a direction perpendicular to the longitudinal direction. For example, the lateral direction of the flight suit is generally denoted by the two-way arrow 2 in FIGS. 1 and 2.

The expression "center" as used herein with respect to a flight suit refers generally to a region of the flight suit at or near the midpoints over the widths of the suit. For example, center generally refers to the region at or near the center line 3 of FIGS. 1 and 2.

The expression "inner" as used herein with respect to a flight suit or any element thereof refers generally to a region of the flight suit or a region of that element that is located in proximity of the center of the helicopter suit.

The expression "outer" as used herein with respect to a flight suit or any element thereof refers generally to a region of the flight suit or a region of that element that is located remotely of the center of the helicopter suit, in particular, an outer region is located further from the center than a corresponding inner region.

The expression "interior surface" as used herein with respect to a flight suit refers to a surface of the suit that faces the body of the pilot when the suit is worn.

The expression "exterior surface" as used herein with respect to a flight suit refers to a surface of the suit that is oriented away from the body of the pilot when the suit is worn.

For example, according to flight suits of the present disclosure, the stretch fabric of the two shoulder portions are extensible by at least 50% in a weft direction and by less than 45% in a warp direction.

For example, according to flight suits of the present disclosure, the stretch fabric of the two shoulder portions are extensible by at least 55% in a weft direction and by 40% or less in a warp direction.

For example, according to flight suits of the present disclosure, the shoulder portions are each tubular and surround the shoulder joint areas of the pilot.

For example, according to flight suits of the present disclosure, the shoulder portions are each in a non-stretched state when the pilot is in a sitting position.

For example, according to flight suits of the present disclosure, the stretch fabric of the shoulder portions is durable, abrasion-resistant and breathable.

For example, according to flight suits of the present disclosure, the stretch fabric of the shoulder portions has an abrasion-resistance of at least 30,000 T according to the ISO 12947-2 standard.

For example, according to flight suits of the present disclosure, the stretch fabric of the shoulder portions has an abrasion-resistance of at least 40,000 T according to the ISO 12947-2 standard.

For example, according to flight suits of the present disclosure, the stretch fabric of the shoulder portions has an abrasion-resistance of at least 50,000 T according to the ISO 12947-2 standard.

For example, according to flight suits of the present disclosure, the extensible crotch panel comprises a stretch fabric that is extensible by at least 45% in a weft direction and by less than 45% in a warp direction, the weft being generally transverse to a longitudinal axis defined by each of the leg portion.

For example, according to flight suits of the present disclosure, the extensible crotch panel comprises a stretch fabric that is extensible by at least 50% in a weft direction and by less than 45% in a warp direction, the weft being generally transverse to the longitudinal axis defined by each of the leg portion.

For example, according to flight suits of the present disclosure, the extensible crotch panel comprises a stretch fabric that is extensible by at least 55% in a weft direction and by 40% or less in a warp direction, the weft being generally transverse to the longitudinal axis defined by each of the leg portion.

For example, according to flight suits of the present disclosure, the extensible crotch panel is in a non-stretched state when the pilot is in a sitting position.

For example, according to flight suits of the present disclosure, the stretch fabric of the extensible crotch panel is durable, abrasion-resistant and breathable.

For example, according to flight suits of the present disclosure, the stretch fabric of the extensible crotch panel has an abrasion-resistance of at least 30,000 T according to the ISO 12947-2 standard.

For example, according to flight suits of the present disclosure, the stretch fabric of the extensible crotch panel has an abrasion-resistance of at least 40,000 T according to the ISO 12947-2 standard.

For example, according to flight suits of the present disclosure, the stretch fabric of the extensible crotch panel has an abrasion-resistance of at least 50,000 T according to the ISO 12947-2 standard.

For example, according to flight suits of the present disclosure, each sleeve comprises the extensible elbow panel.

For example, according to flight suits of the present disclosure, the extensible elbow panels comprise each a stretch fabric that is extensible by at least 45% in a weft direction and by less than 45% in a warp direction, the weft being generally aligned with a longitudinal axis defined by each sleeve.

For example, according to flight suits of the present disclosure, the extensible elbow panels comprise each a stretch fabric that is extensible by at least 50% in a weft direction and by less than 45% in a warp direction, the weft being generally aligned with a longitudinal axis defined by each sleeve.

For example, according to flight suits of the present disclosure, the extensible elbow panels comprise each a stretch fabric that is extensible by at least 55% in a weft direction and by 40% or less in a warp direction, the weft being generally aligned with a longitudinal axis defined by each sleeve.

For example, according to flight suits of the present disclosure, the extensible elbow panels are each in a non-stretched state when the pilot is in a sitting position.

For example, according to flight suits of the present disclosure, the stretch fabric of the extensible elbow panels are durable, abrasion-resistant and breathable.

For example, according to flight suits of the present disclosure, the stretch fabric of the extensible elbow panels has an abrasion-resistance of at least 30,000 T according to the ISO 12947-2 standard.

For example, according to flight suits of the present disclosure, the stretch fabric of the extensible elbow panels has an abrasion-resistance of at least 40,000 T according to the ISO 12947-2 standard.

For example, according to flight suits of the present disclosure, the stretch fabric of the extensible elbow panels has an abrasion-resistance of at least 50,000 T according to the ISO 12947-2 standard.

For example, according to flight suits of the present disclosure, each elbow panel extends along a portion of the circumference of the sleeve, a non-elastic panel of the sleeve forming a discontinuity in the extension, the circumferential extension of the elbow panel defining an angle greater than 180 degrees.

For example, according to flight suits of the present disclosure, the weft direction of the stretch fabric of the extensible crotch panel is in a rear-front direction and/or in a lateral direction.

For example, according to flight suits of the present disclosure, the lower portion further comprises an extensible lower back panel extending between a rear waist edge of the lower portion and buttocks portion of the lower portion, wherein the extensible lower back panel comprises a stretch fabric that is extensible by at least 45% in a weft direction and by less than 45% in a warp direction, the weft being generally parallel to an axis defined by a dorsal spine of the pilot.

For example, according to flight suits of the present disclosure, the lower portion further comprises an extensible lower back panel extending between a rear waist edge of the lower portion and buttocks portion of the lower portion, wherein the extensible lower back panel comprises a stretch fabric that is extensible by at least 50% in a weft direction and by less than 45% in a warp direction, the weft being generally parallel to an axis defined by a dorsal spine of the pilot.

For example, according to flight suits of the present disclosure, the lower portion further comprises an extensible lower back panel extending between a rear waist edge of the lower portion and buttocks portion of the lower portion, wherein the extensible lower back panel comprises a stretch fabric that is extensible by at least 55% in a weft direction and by 40% or less in a warp direction, the weft being generally parallel to an axis defined by a dorsal spine of the pilot.

For example, according to flight suits of the present disclosure, the lower back panel is in a non-stretched state when the pilot is in a sitting position.

For example, according to flight suits of the present disclosure, the stretch fabric of the extensible lower back panel is durable, abrasion-resistant and breathable.

For example, according to flight suits of the present disclosure, the stretch fabric of the lower back panel has an abrasion-resistance of at least 30,000 T according to the ISO 12947-2 standard.

For example, according to flight suits of the present disclosure, the stretch fabric of the lower back panel has an abrasion-resistance of at least 40,000 T according to the ISO 12947-2 standard.

For example, according to flight suits of the present disclosure, the stretch fabric of the lower back panel has an abrasion-resistance of at least 50,000 T according to the ISO 12947-2 standard.

For example, according to flight suits of the present disclosure, each leg portion further comprises an extensible knee panel effective for covering a knee region of each leg of the pilot, each knee panel comprising a stretch fabric that is extensible by at least 45% in a weft direction and by no less than 45% in a warp direction, the weft direction being generally aligned with the longitudinal axis defined by each of the leg portions.

For example, according to flight suits of the present disclosure, each leg portion further comprises an extensible knee panel effective for covering a knee region of each leg of the pilot, each knee panel comprising a stretch fabric that is extensible by at least 50% in a weft direction and by less than 45% or less in a warp direction, the weft direction being generally aligned with the longitudinal axis defined by each of the leg portions.

For example, according to flight suits of the present disclosure, each leg portion further comprises an extensible knee panel effective for covering a knee region of each leg of the pilot, each knee panel comprising a stretch fabric that is extensible by at least 55% in a weft direction and by 40% or less in a warp direction, the weft direction being generally aligned with the longitudinal axis defined by each of the leg portions.

For example, according to flight suits of the present disclosure, the extensible knee panels are in a non-stretched state when the pilot is in a sitting position.

For example, according to flight suits of the present disclosure, the stretch fabric of the extensible knee panels is durable, abrasion-resistant and breathable.

For example, according to flight suits of the present disclosure, the stretch fabric of the extensible knee panels has an abrasion-resistance of at least 30,000 T according to the ISO 12947-2 standard.

For example, according to flight suits of the present disclosure, the stretch fabric of the extensible knee panels has an abrasion-resistance of at least 40,000 T according to the ISO 12947-2 standard.

For example, according to flight suits of the present disclosure, the stretch fabric of the extensible knee panels has an abrasion-resistance of at least 50,000 T according to the ISO 12947-2 standard.

For example, according to flight suits of the present disclosure, the pilot suit further includes a breathable interior lining extending over an interior surface of at least a rear portion of the torso portion.

For example, according to flight suits of the present disclosure, the breathable interior lining extends about a left breast portion, rear portion and a right breast portion of the interior surface of the torso portion, a first longitudinal edge of the interior lining coupled to a first longitudinal edge of a center panel of the torso portion, a second longitudinal edge of the interior lining coupled to the second longitudinal edge of the center panel of the torso portion.

For example, according to flight suits of the present disclosure, the center panel of the torso portion is substantially free of the interior lining.

For example, according to flight suits of the present disclosure, the center panel comprises a closure mechanism for closing a first inner edge of the center panel and a second inner edge of the center panel.

For example, according to flight suits of the present disclosure, the rear portion of the torso portion define a plurality of longitudinal openings.

For example, according to flight suits of the present disclosure, the longitudinal openings are covered by a breathable material.

For example, according to flight suits of the present disclosure, the rear portion of the torso portion is formed of a first rear side panel, a rear center panel, and a second rear side panel, an overlap of the first rear side panel and the rear center panel defining a first of the longitudinal openings, and an overlap of the second rear side panel and the rear center panel defining a second of the longitudinal openings.

For example, according to flight suits of the present disclosure, the extensible inner panels comprising each a stretch fabric that is extensible by at least 50% in a weft direction and by less than 45% in a warp direction, the weft direction being generally transverse to a longitudinal axis defined by each of the leg portions.

For example, according to flight suits of the present disclosure, the extensible inner panels comprising each a stretch fabric that is extensible by at least 55% in a weft direction and by less than 45% in a warp direction, the weft direction being generally transverse to a longitudinal axis defined by each of the leg portions.

For example, according to flight suits of the present disclosure, the inner region extends from the ankle up to at least one fourth of the height of the tibia of the pilot.

For example, according to flight suits of the present disclosure, the inner region extends from the ankle up to at least one fourth of the height of the tibia of the pilot.

For example, according to flight suits of the present disclosure, the suit is a two piece suit that comprise an upper piece comprising the torso portion and a lower piece comprising the lower portion.

For example, the flight suit can be a one-piece flight suit.
For example, the flight suit can be a two-piece flight suit.
For example, the flight suit can be a multi-piece flight suit.
For example, the flight suit can be a helicopter pilot suit.
For example, the flight suit can be a glider pilot suit.
For example, the flight suit can be an airplane pilot suit.

Figure 2:
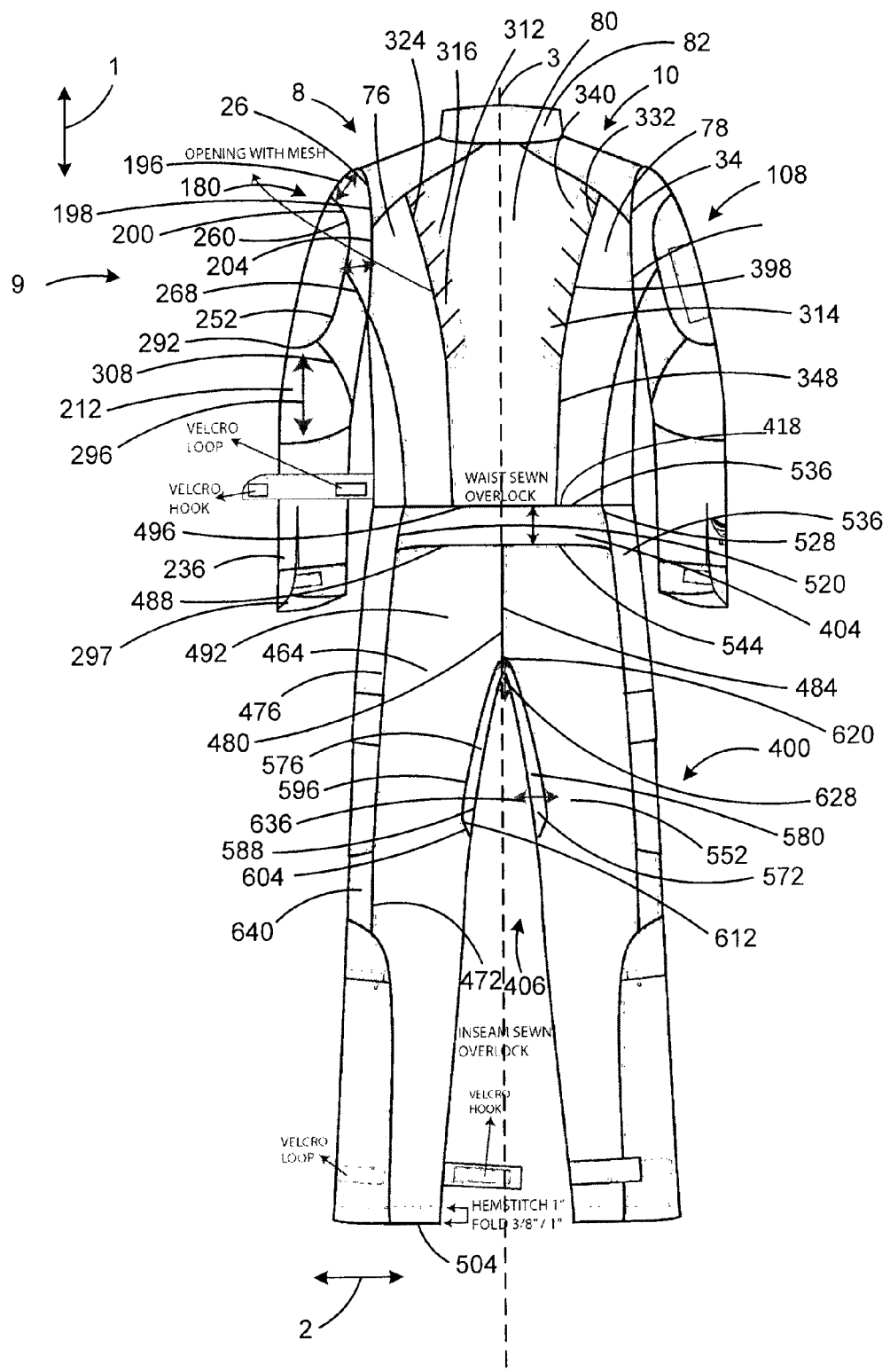
FIG. 2 illustrates a plan view of a rear exterior of the flight suit according to various exemplary embodiments.

Referring now to FIGS. 1 and 2, therein illustrated are a plan view of the front and a plan view of the rear respectively of a flight suit 8 according to various exemplary embodiments. The flight suit 8 includes an upper portion 9 having a torso portion 10. The flight suit 8 can be used as a helicopter pilot suit.

An exterior layer of the torso portion 10 is substantially formed of a primary fabric that is soft and light. For example, the outer layer of the torso portion 10 can be substantially formed of cotton or a fireproof material such as flame resistant Nomex™. The outer layer of the torso portion 10 has the general shape of a sleeveless vest and defines an inner chamber, neck opening 18, left arm opening 26, right arm opening 34 and waist opening 42. When the flight suit 8 is worn, the torso of the pilot is accommodated within the inner chamber and the torso portion 10 is generally worn over the upper body of the pilot.

According to various exemplary embodiments, the torso portion 10 is formed a plurality of panels of the primary fabric coupled together. According to one example, the torso portion 10 is formed of left shoulder panel 50, right shoulder panel 58, left breast panel 66, right breast panel 74, left rear side panel 76, right rear side panel 78 and center rear panel 80. The torso portion 10 may further have a neck collar 82 having a snap 86 for attaching and detaching ends of the neck collar 82. The torso portion 10 may further have a left loop 90 coupled to a longitudinal inner edge 98 of the left breast panel 66 and a left strap 106 coupled to an outer edge of the left breast panel 66. The left strap 106 can be passed through the left loop 90 and folded over the loop 90 and fastened to itself, for example using hook and loop fasteners on the strap 106. In this way, the fit of the torso portion 10 about the waist of the pilot can be adjusted. Similarly, torso portion 10 may further have a right loop 114 coupled to a longitudinal inner edge 122 of the right breast panel 74 and a right strap 130 coupled to an outer edge of the right breast panel 74. The left strap 130 can be passed through the right loop 114 and folded over the loop 114 and fastened to itself, for example using hook and loop fasteners on the strap 130. In this way, the fit of the torso portion 10 about the waist of the pilot can be further adjusted.

According to one exemplary embodiment, the longitudinal inner edge 98 of the left breast panel 66 contacts the longitudinal inner edge 122 of the right breast panel 66. Accordingly the left breast panel 66 and the right breast panel 66 have one or more closure mechanisms for attaching the panels 66 and 74 together. For example, cooperating teeth of a zipper mechanism can be provided on the longitudinal inner edges 98 and 122.

According to an alternative exemplary embodiment, the torso portion 10 further includes a front center panel 138. The front center panel 138 is coupled at a longitudinal left edge 146 to the longitudinal inner edge 98 of the left breast panel 66. The front center panel 138 is further coupled at a longitudinal right edge 154 to the longitudinal inner edge 122 of the right breast panel 74. For example, the front center panel 138 has a generally inverted trapezoidal shape or triangular shape and the longitudinal left edge 146 and longitudinal right edge 154 form an incline with a center of the torso portion. One of the longitudinal edges of the center panel 138 and a longitudinal inner edge of one of the left breast panel 66 and right breast panel 74 has closure mechanisms for attachment thereto. When the center panel 138 is detached from one of the left breast panel 66 and right breast panel 74, the center panel 138 can be folded about its coupling with the other of the left breast panel 66 and right breast panel 74 to expose an opening corresponding to the generally trapezoidal or triangular shape of the center panel 138. For example, such an opening may facilitate the pilot's task of putting on the flight suit 8.

According to various exemplary embodiments, at least one of the left breast panel 66 and right breast panel 74 can have a breast pocket formed thereon. For example, as illustrated in FIG. 1, the left breast panel 66 has a first pocket accessible via opening 162 extending in a direction parallel to the longitudinal inner edge 98. For example, the opening 162 can be closed using a zipper. Furthermore, the right breast panel 74 has a second pocket accessible via opening 170 extending in a direction parallel to the longitudinal right edge 122. For example the opening 170 can be closed using a zipper.

A left sleeve 180 is coupled about the left arm opening 26 of the torso portion 10. The left sleeve 180 consists of a generally tubular member that accommodates a left arm of the pilot when the flight suit 8 is worn.

A right sleeve 188 is coupled about the right arm opening 34 of the torso portion. The right sleeve 188 consists of a generally tubular member that accommodates a right arm of the pilot when the flight suit 8 is worn.

Both the left sleeve 180 and right sleeve 188 define respective longitudinal axes, which extend from their respective upper arm ends to their respective cuff ends.

It will be understood that the left sleeve 180 and right sleeve 188 are formed of substantially similar and corresponding elements and that the description provided herein in relation to the left sleeve 180 is applicable to the right sleeve 188 with applicable adaptations or modifications.

According to various exemplary embodiments, the left sleeve 180 is coupled to the left arm opening 26 of the torso portion 10 via a left shoulder portion 196. It will be understood that the right sleeve 188 is coupled to the right arm opening 34 of the torso portion 10 via a right shoulder portion having substantially similar and corresponding elements as the left shoulder portion 196, and that the description provided herein in relation to the left shoulder portion 196 is applicable to the right shoulder portion with applicable adaptations or modifications.

The left shoulder portion 196 is an extensible panel. The left shoulder portion 196 defines a first edge 198 and a second opposing edge 200. The first edge 198 of the tubular left shoulder portion 196 is coupled to an edge of the torso portion 10 defining the arm opening 26. The second edge 200 of the left shoulder portion 196 is coupled to an upper edge of the left sleeve 180. When the flight suit 8 is worn, the left shoulder portion 196 at least partially covers shoulder joint areas of the pilot. According to one exemplary embodiment, the left shoulder portion 196 is tubular. The left shoulder portion 196 being tubular herein refers to the left shoulder portion 196 having a fabric layer that extends continuously to form an annular member and define a hollow inner passage. For example, when the flight suit 8 is worn, the pilot's arm projects through openings defined by the first and second edges 198, 200 and the left shoulder portion 196 surrounds the shoulder joint area of the pilot.

The left shoulder portion 196 is extensible in a direction generally transverse to its first and second edges 198, 200. For example, it is extensible in a direction aligned with the longitudinal direction of the left sleeve 180. For example, the direction in which the left shoulder portion 196 is represented by two-way arrow 202. For example, the left shoulder portion 196 will be stretched in this direction when the pilot moves their left arm in a manner that exerts a force in the longitudinal direction of the sleeve 180. It will be appreciated that the extensible property of the left shoulder portion 196 facilitates various movements of the pilot.

The left shoulder portion 196 includes a stretch fabric that is extensible by at least 45% in a weft direction and by less than 45% in a warp direction, the weft direction being generally transverse to the first and second edges 198, 200. For example, the whole of the left shoulder portion 196 may be formed of the stretch fabric. In some examples, the stretch fabric may be extensible by at least 50% in the weft direction and by less than 45% in the warp direction. In some further examples, the stretch fabric may be extensible by at least 55% in the weft direction and by 40% or less in the warp direction.

According to various exemplary embodiments, the stretch fabric of the left shoulder portion 196 is durable, resistant to abrasion and breathable. For example, the stretch fabric has a breaking strength of at least 1800 N in the warp direction and at least 1200 N in the weft direction according to the ISO 13934-1 standard. For example, the stretch fabric has an air-permeability of 50-150 l/m²/s according to the EN ISO 9237 standard. For example, the stretch fabric has an abrasion-resistance of at least 30,000 T according to the ISO 12947-2 standard. Alternatively, the stretch fabric has an abrasion-resistance of at least 40,000 T according to the ISO 12947-2 standard. Alternatively, the stretch fabric has an abrasion-resistance of at least 50,000 T according to the ISO 12947-2 standard.

For example, the stretch fabric of the left shoulder portion 196 is formed of Schoeller—Dynamic™ fabric.

According to various exemplary embodiments, the left shoulder portion 196 is appropriately sized and/or shaped so that it is in a non-stretched state when the pilot is in a sitting position. For example, the left shoulder portion 196 is in a non-stretched state when the pilot is in a sitting position taken in the cockpit of a helicopter. For example, a distance between the first edge and second of the left shoulder portion 196 may be greater at a rear side 204. Accordingly the left shoulder portion 196 remains in a non-extended state when the pilot extends their left arm forwardly, for example to grasp a control stick of a helicopter.

According to various exemplary embodiments, the left sleeve 180 is formed of a plurality of panels. For example, the left sleeve 180 comprises an upper arm panel 212, elbow panel 220, middle panel 228 and tubular forearm portion 236.

For example, the upper arm panel 212 has a generally oval shape extending lengthwise in the longitudinal direction of the left sleeve 180. An upper edge 244 of the upper arm panel 212 is coupled to a portion of the second edge 200 of the left shoulder portion 196. The middle panel 228 is coupled at a first edge to a first longitudinal edge 252 of the upper arm panel 212, extends circumferentially about the sleeve 180 and is coupled to a second longitudinal edge 260 of the upper arm panel 212. An upper lateral edge 268 of the middle panel 228 is coupled to a portion of the second edge 200 of the left shoulder portion 196. Accordingly, the middle panel 228 and the upper arm panel 212 form together a tubular member through which the upper arm of the pilot projects when the flight suit 8 is worn. The middle panel 228 and the upper arm panel 212 are both formed of the primary fabric. A lower lateral edge 276 of the middle arm panel is coupled to a portion of an upper lateral edge 284 of the forearm portion 236. For example, the upper arm panel 212 may have formed thereon one or more pockets. For example, the upper arm panel has formed thereon a patch pocket 286 and a zip pocket 288.

The elbow panel 220 is extensible and is coupled to a lower lateral edge 292 of the upper arm panel 212, longitudinal edges 300, 308 of the middle panel 228 and a second portion of the upper lateral edge 284 of the forearm portion 236. Accordingly, the elbow panel 220 is located generally on an outer middle portion of the sleeve 180, which corresponds to a left elbow of the pilot when the flight suit 8 is worn. For example, the elbow panel extends in a longitudinal direction between the lower lateral edge 292 of the upper arm panel 212 and upper lateral edge 284 of the forearm portion 236. Furthermore, the elbow panel 220 extends circumferentially about the left sleeve 180 and the middle panel 228 forms a discontinuity between two longitudinal edges of the elbow panel 220. For example, the elbow panel 220 can extends about the circumference of the sleeve 180 over a circumferential portion defining an angle greater than 180°.

The elbow panel 220 is extensible in a longitudinal direction of the left sleeve 180. For example, the direction of the extension of the elbow panel 220 is indicated by arrow 296. For example, when coupled to the upper arm panel 212 and forearm portion 236, the elbow panel 220 is extensible in a direction transverse to the lower lateral edge 292 of the upper arm panel 212 and upper lateral edge 284 of the forearm portion 236.

The elbow panel 220 includes a stretch fabric that is extensible by at least 45% in a weft direction and by less than 45% in a warp direction, the weft direction being generally aligned with the longitudinal direction of the sleeve 180. For example, the whole of the elbow panel 220 may be formed of the stretch fabric. In some examples, the stretch fabric may be extensible by at least 50% in the weft direction and by less than 45% in the warp direction. In some further examples, the stretch fabric may be extensible by at least 55% in the weft direction and by 40% or less in the warp direction.

According to various exemplary embodiments, the stretch fabric of the elbow panel 220 is durable, resistant to abrasion and breathable. For example, the stretch fabric has a breaking strength of at least 1800 N in the warp direction and at least 1200 N in the weft direction according to the ISO 13934-1 standard. For example, the stretch fabric has an air-permeability of 50-150 l/m²/s according to the EN ISO 9237 standard. For example, the stretch fabric has an abrasion-resistance of at least 30,000 T according to the ISO 12947-2 standard. Alternatively, the stretch fabric has an abrasion-resistance of at least 40,000 T according to the ISO 12947-2 standard. Alternatively, the stretch fabric has an abrasion-resistance of at least 50,000 T according to the ISO 12947-2 standard.

For example, the left elbow panel is formed of Schoeller—Dynamic™ fabric.

According to various exemplary embodiments, the extensible elbow panel 220 is appropriately sized and/or shaped so that it is in a non-stretched state when the pilot is in a sitting position. For example, the elbow panel 220 is in the non-stretched state when the pilot is in a sitting position taken in the cockpit of a helicopter. For example a sufficient length of the elbow panel 220 defined by the distance between the lower lateral edge 292 of the upper arm panel 212 and the upper lateral edge 284 of the forearm portion 236 is provided so that the elbow panel 220 remains in its non-stretch state when the sleeve 180 is bent in the forward direction at an obtuse angle between the upper arm panel and the sleeve portion. Further bending of the sleeve 180, for example, to form a right angle or acute angle causes the extensible elbow panel 220 to be stretched.

When the flight suit 8 is worn, the forearm portion 236 of the left sleeve 180 contours a forearm of the wear. According to various exemplary embodiments, an outer portion of a cuff 297 of the forearm portion 236 is longer than an inner portion of the cuff 297, thereby providing additional protection to the head of the wear. For example, the forearm portion 236 may have formed thereon a longitudinal gap 298, which may closed by fastening closure mechanisms provided on the cuff 297, such as hook and loop fasteners.

According to various exemplary embodiments, the rear of the torso portion 10 defines at least a first longitudinal opening 312 and second longitudinal opening 314. The left rear side panel 76 may extend in a lateral direction towards the center of the rear of the torso portion 10 such that a longitudinal inner edge 316 of the left rear side panel 76 is positioned closer towards the center of the torso portion 10 than a longitudinal left edge 324 of the center rear panel 80. Accordingly, a portion of the left rear side panel 76 proximate its longitudinal inner edge 316 and a portion the center rear panel 80 proximate its longitudinal left edge 324 can be partially overlapping. The overlapping portions of the left rear side panel 76 and center rear panel 80 may be non-coupled to define the first longitudinal opening 312. Alternatively, the overlapping portions may be coupled via a breathable fabric panel covering the first longitudinal opening 312. For example, the breathable fabric panel is a breathable mesh material. In both examples, the first longitudinal opening 312 defined by the left rear side panel 76 and the center rear panel 80 allows air to flow between the inner chamber defined by the torso portion 10 and an environment outside the flight suit 8. The flow of air via the first longitudinal opening 312 helps the pilot stay cool when the flight suit 8 is worn.

The right rear side panel 78 may extend in a lateral direction towards the center of the rear of the torso portion such that a longitudinal inner edge 340 of the right rear side panel 78 is positioned closer than the longitudinal center of the torso portion 10 than a longitudinal right edge 348 of the center rear panel 80. Accordingly, a portion of the right rear side panel 78 proximate its longitudinal inner edge 340 and a portion of the center rear panel 80 proximate its longitudinal right edge 348 can be partially overlapping. The overlapping portions of the right rear side panel 78 and center rear panel 80 may be non-coupled to define the second longitudinal opening 314. Alternatively, the overlapping portions may be coupled via a breathable fabric panel covering the second longitudinal opening 314. For example, the breathable fabric panel is a breathable mesh material. In both examples, the second longitudinal opening 314 defined by the right rear side panel 78 and the center rear panel 80 allows air to flow between an inner chamber defined by the torso portion 10 and an environment outside the flight suit 8. The flow air via the second longitudinal opening 314 helps the pilot stay cool when the flight suit 8 is worn.

Figure 4:
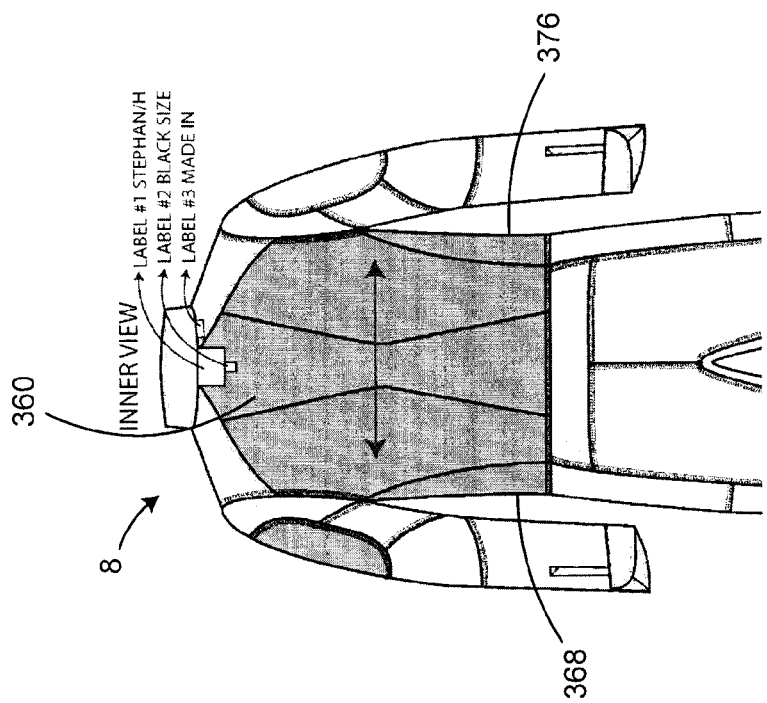
FIG. 4 illustrates a plan view of a rear interior of the flight suit according to various exemplary embodiments.
Figure 3:
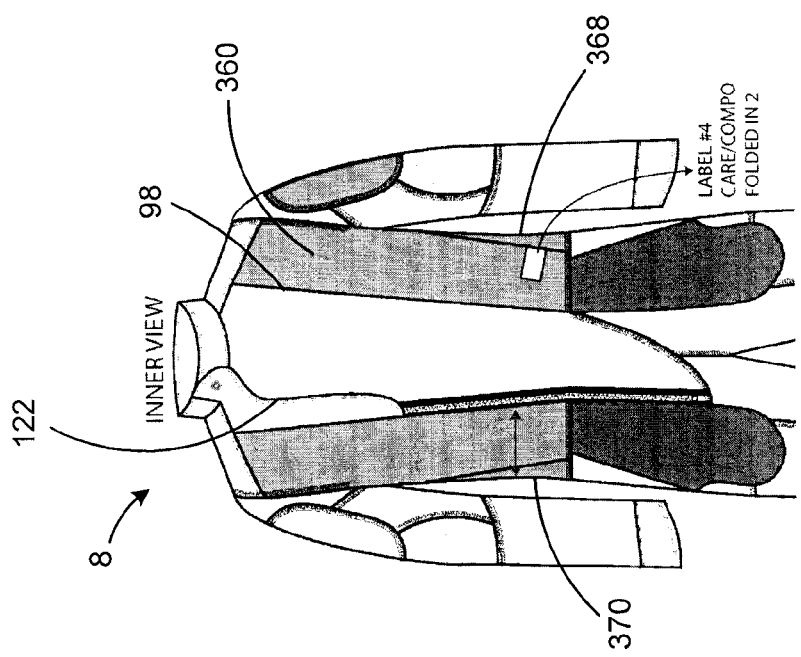
FIG. 3 illustrates a plan view of a front interior of the flight suit according to various exemplary embodiments.

Referring now to FIGS. 3 and 4, therein illustrated are a plan view of the front and a plan view of the rear respectively of an interior surface of the upper portion of the flight suit 8 according to various exemplary embodiments. It should be understood that FIGS. 3 and 4 illustrate portions of the flight suit 8 when flipped inside out.

The interior surface of the torso portion 10 includes an interior lining 360, which extends over at least a rear of the torso portion 10. For example, the interior lining 360 extends from a left rear side 368 across the rear of the torso portion 10 to a right rear side 376. The interior lining 360 is formed of a breathable fabric which promotes aeration and helps the pilot stay cool when the flight suit 8 is worn. For example, the breathable interior lining 360 is a breathable mesh material. For example, the interior lining 360 can be further extensible in a lateral direction between the left rear side 368 and right rear side 376.

In various exemplary embodiments, the interior lining 360 can further at least partially extend over the front of the torso portion 10. For example, in addition to extending over the rear of the torso portion 10, the interior lining 360 further extends laterally about a left breast portion and a right breast portion of the front of the torso portion 10. For example, the extension over the left breast portion corresponds to left breast panel 66 of the exterior layer of the torso portion 10 and extends from the left side 368 to the longitudinal inner edge 98 of the left breast panel 66. For example, the extension over the right breast portion corresponds to the right breast panel 74 and extends from the right side 376 to the longitudinal inner edge 122 of the right breast panel 74.

According to the exemplary embodiment wherein the torso portion includes a generally trapezoidal or triangular front center panel 138, a first longitudinal edge of the interior lining 360 is coupled to a longitudinal left edge 146 of the center panel 138, the interior lining 360 extends about the left breast portion, over the rear of the torso portion, about the right breast portion of the interior surface of the torso portion 10 and a second longitudinal edge of the interior lining 360 is coupled to a longitudinal right edge 154 of the center panel 138. Accordingly, the front center panel 138 is free of (not covered) by the interior lining 360.

The interior lining 360 may be formed of one integral breathable fabric. Alternatively, the interior lining 360 may be formed of a plurality of panels coupled together.

Referring back to FIGS. 1 and 2, the flight suit 8 further includes a lower portion 400. The lower portion 400 further includes a lower back panel 404, a crotch panel 406, a left leg portion 408 and a right leg portion 416. It will be understood that the left leg portion 408 and right leg portion 416 are formed of substantially similar and corresponding elements and that the description provided herein in relation to the left leg portion is applicable to the right leg portion 416 with applicable adaptations or modifications. Both the left leg portion 408 and right leg portion 416 define respective longitudinal axes, which extend from their respective waist ends to their respective ankle ends.

The lower portion 400 defines a waist edge 418 extending circumferentially about the lower portion 400. According to various exemplary embodiments, the flight suit 8 is a one piece garment and the lower portion 400 is coupled at its waist edge 418 to a waist edge 424 of the torso portion 10.

Alternatively, the flight suit 8 is a multi-piece garment, wherein the upper portion 9 and the lower portion 400 are discrete pieces (as shown by example only in FIGS. 7-10). Accordingly, the lower portion 400 may have a band 426 extending about its waist edge 418. For example, the band 426 is extendible to allow an expansion of a waist opening 427 of the lower portion 400 defined by the waist edge 418.

Figure 11:
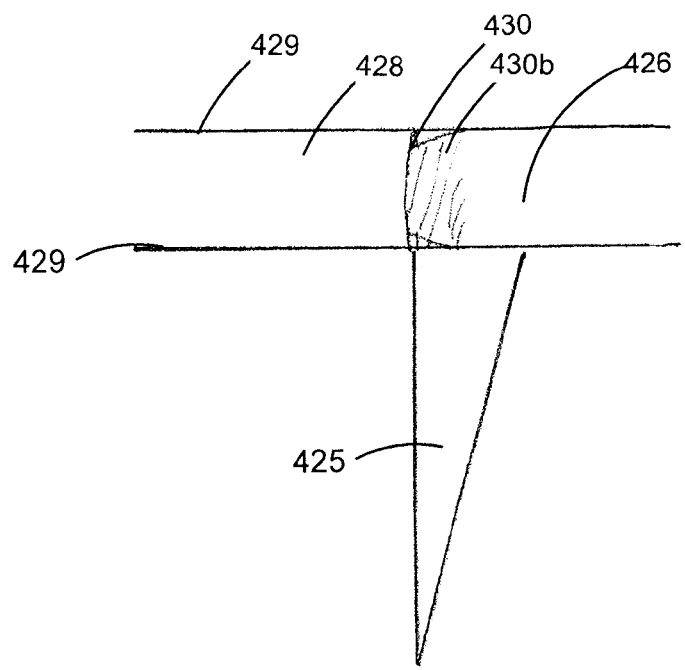
FIG. 11 illustrates a plan view of a tongue and sleeve assembly of a band of the flight suit according to various exemplary embodiments.
Figure 12:
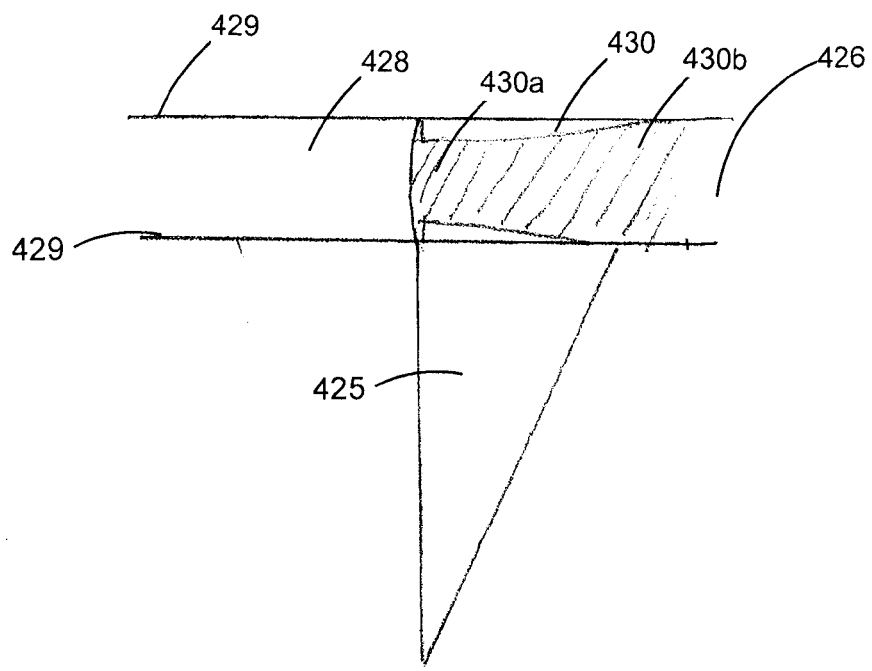
FIG. 12 illustrates a plan view of the tongue and sleeve assembly of the band of the flight suit according to various exemplary embodiments.

Referring now to FIGS. 11 and 12, therein illustrated are plan views of a tongue and sleeve assembly of the band 426 in a relaxed and stretched position according to various exemplary embodiments. For example, the tongue and sleeve assembly is located proximate lateral sides of the band 426. For example, the tongue and sleeve assembly is located proximate side pockets 425 of the lower portion 400. According to the exemplary embodiment, the band 426 includes a sleeve 428, which may be coupled at its edges 429 to the band 426 to define an inner channel 428*a*.

Figure 13:
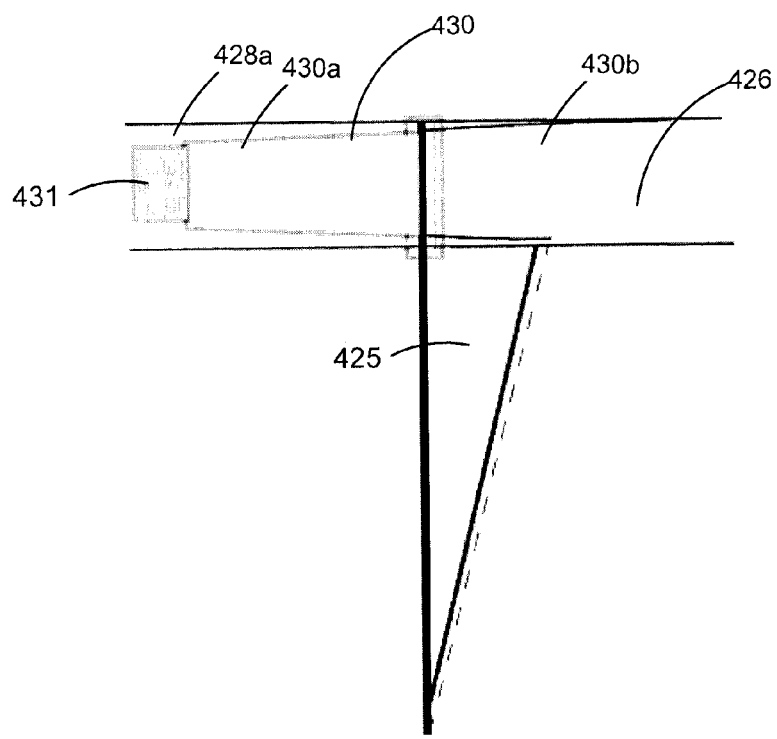
FIG. 13 illustrates a cutaway plan view of the tongue and sleeve assembly of the band of the flight suit according to various exemplary embodiments.

For example, the band 426 further includes a tongue 430 having a tapered portion 430*a* and a base 430*b*. The base 430*b* of the tongue 430 may be coupled to a non-sleeved portion of the band 426. An end of the tapered portion 430*a* extends into the channel 428*a* defined by the sleeve 428 and is coupled via an elastic member 431 located within the channel 428*a* to the band 426. In a relaxed position, the tongue 430 is biased towards the elastic member 431 and towards the attachment point of the elastic member 431 with the band 426. For example, as illustrated in FIG. 11, the tapered portion 430*a* of the tongue 430 is substantially inserted within the channel 428*a* defined by the sleeve 428. Referring now to FIG. 13, therein illustrated is a cutaway plan view of the tongue and sleeve assembly according to various exemplary embodiments wherein the sleeve 428 has been cutaway for illustrative purposes. As illustrated in FIG. 13, the elastic member 431 is in a retracted state and has a shorter length. For example, when the tongue 430 is in the relaxed position, a portion of the band 426 between the attachment point of the elastic member 431 and the base 430*b* can be folded or scrunched.

Figure 14:
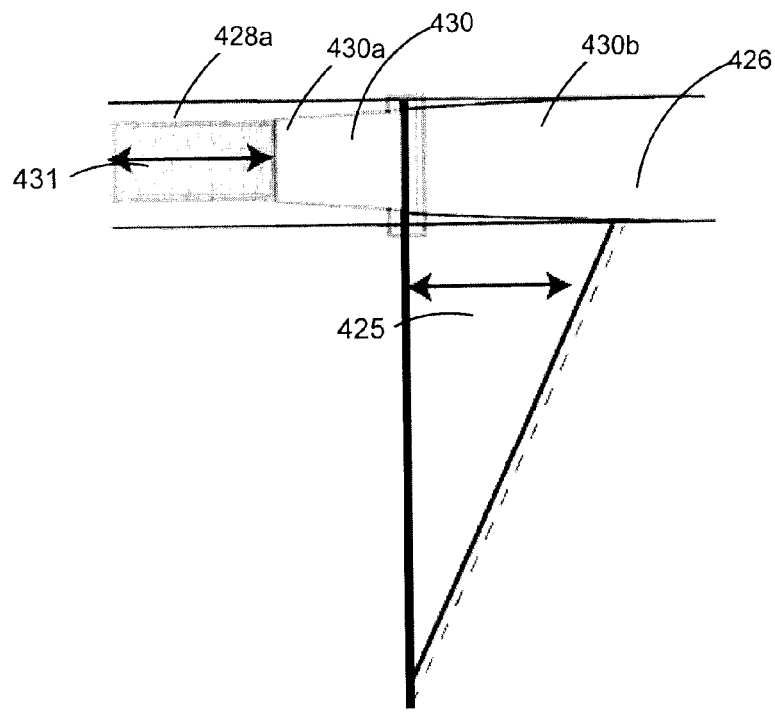
FIG. 14 illustrates a cutaway plan view of the tongue and sleeve assembly of the band of the flight suit according to various exemplary embodiments.

Referring back to FIG. 12, when a force is applied to the band 426 in a direction away from the attachment point of the elastic member 431 to the band 426, the tongue 430 is displaced to its extended position. For example, as illustrated in FIG. 12, the tapered portion 430*a* of the tongue 430 is displaced away from the attachment point and is substantially exposed outside of the channel 428*a*. Accordingly, the base 430*b* of the tongue 430 is displaced away from the attachment point, thereby expanding the opening 427 defined by the band 426. For example, the portion of the band 426 between the attachment point of the elastic member 431 and the base 430*b* is unfolded or smoothed out when the tongue 430 is in the extend position. Accordingly, the opening 427 defined by the band 426 is larger when the tongue 430 is in the extended position as compared to the size of the opening 427 when the tongue 430 is in the relaxed position. Referring now to FIG. 14, therein illustrated is a cutaway plan view of the tongue and sleeve assembly according to various exemplary embodiments wherein the sleeve 428 is cutaway for illustrative purposes. As illustrated in FIG. 14, when the tongue 430 is in its extended position, the elastic member 431 is in a stretched state and has a longer length and only an end region of the tapered portion 430*a* of the tongue 430 is inserted with the channel 428.

A left leg portion 408 is coupled to the left front and left rear of the torso portion 10. The left leg portion 408 consists of a generally tubular member that accommodates a left leg of the pilot when the flight suit 8 is worn. The left leg portion 408 may be formed of a plurality of panels of the primary fabric and one or more panels of the extensible fabric coupled together. Alternatively, the left leg portion 408 may be formed of one piece of the primary fabric and other pieces of extensible fabric, and the panels described herein correspond to portions of the one piece left leg portion 408.

A front of the left leg portion 408 extends from a front left portion of the waist edge 418 of the lower portion 400. For example, an edge 428 of a front thigh panel 432 formed of the primary material extends from the front portion of the waist edge 418 and the front thigh panel 432 extends longitudinally from the waist edge 418. The front thigh panel 432 covers a left thigh of the pilot. For example, a lower lateral edge 440 is located slightly above the left knee of the pilot when the flight suit 8 is worn.

The front thigh panel 432 may have formed thereon one or more pockets. For example, the front thigh panel 432 may have formed thereon on a left front pocket 448 and a left thigh pocket 456. Alternatively, the left front pocket 448 and left thigh pocket 456 may also be subpanels that are coupled to the front thigh panel 432 to form a front thigh panel of the left leg portion 408.

The left leg portion 400 includes a rear left leg panel 464 formed of the primary material. An outer longitudinal edge 472 of the rear left leg panel 464 is coupled to an outer longitudinal edge 476 of the front thigh panel 432. A portion of an inner longitudinal edge 480 of the rear left leg panel 464 is coupled to a corresponding portion of an inner longitudinal edge 484 of the left leg panel. An upper lateral edge 488 of the rear left leg panel 464 is spaced apart from a rear portion of the waist edge 418 of the lower portion 400. The portion of the rear left leg panel 464 proximate the upper lateral edge 488 defines a buttock portion 492 of the rear of the left leg portion 408. The rear left leg panel 464 further extends longitudinally to a lower lateral edge 504. When the flight suit 8 is worn, the lower lateral edge 504 substantially covers the backside of the leg of the pilot.

The rear left leg panel 464 extends from the waist edge 418 of the lower portion partially via the lower back panel 404. The lower back panel 404 is a planar and extensible member. The extensible lower back panel 512 extends in a lateral direction about the rear of the lower portion 400. The extensible lower back panel 512 further extends in the longitudinal direction between a rear portion of the waist edge of the lower portion 400 and buttock portion 492 of the lower portion 400. For example, a left longitudinal edge 520 of the lower back panel 404 is coupled to an upper portion of the outer longitudinal edge 476 of the front thigh panel 432, a right longitudinal edge 528 of the lower back panel 404 is coupled to an outer longitudinal edge of a right front thigh panel of the lower portion 400. For example, an upper lateral edge 536 of the lower back panel 404 extends from the rear portion of the waist edge 418 of the lower portion 400 and a lower lateral edge 544 of the lower back panel 404 is coupled to the upper lateral edges of the rear left leg panel 488 and a rear right leg panel.

The lower back panel 404 is extensible in a longitudinal direction of the lower portion 400, which corresponds with a direction transverse to its upper and lower lateral edges 536 and 544. For example, the lower back panel 404 is extensible in a longitudinal direction generally parallel to an axis defined by a dorsal spine of the pilot. For example, the lower back panel 404 will extend in the longitudinal direction when the pilot moves their back in a manner that exerts a force in the longitudinal direction of the lower portion 400. It will be appreciated that the extensible property of the lower back panel 404 facilitates various movements of the pilot, such as forward bending of the upper body of the pilot.

The lower back panel 404 includes a stretch fabric that is extensible by at least 45% in a weft direction and by less than 45% in a warp direction, the weft direction being generally transverse to the waist edge 418 of the lower portion 400. For example the weft direction is generally parallel to an axis defined by a dorsal spine of the pilot. For example, the whole of the lower back panel 404 may be formed of the stretch fabric. In some examples, the stretch fabric may be extensible by at least 50% in the weft direction and by less than 45% in the warp direction. In some further examples, the stretch fabric may be extensible by at least 55% in the weft direction and by 40% or less in the warp direction.

According to various exemplary embodiments, the stretch fabric of the lower back panel is durable, resistant to abrasion and breathable. For example, the stretch fabric has a breaking strength of at least 1800 N in the warp direction and at least 1200 N in the weft direction according to the ISO 13934-1 standard. For example, the stretch fabric has an air-permeability of 50-150 l/m$^2$/s according to the EN ISO 9237 standard. For example, the stretch fabric has an abrasion-resistance of at least 30,000 T according to the ISO 12947-2 standard. Alternatively, the stretch fabric has an abrasion-resistance of at least 40,000 T according to the ISO 12947-2 standard. Alternatively, the stretch fabric has an abrasion-resistance of at least 50,000 T according to the ISO 12947-2 standard.

For example, the lower back panel 404 is formed of Schoeller—Dynamic™ fabric.

According to various exemplary embodiments, the lower back panel 404 is appropriately sized and/or shaped so that it is in a non-stretched state when the pilot is in a sitting position. For example, the lower back panel 404 is in a non-stretched state when the pilot is in a sitting position taken in the cockpit of a helicopter.

The lower portion 400 further includes the crotch panel 406. The crotch panel 406 has a generally elongated shape which defines a V-shape when the flight suit 8 is worn. The V-shape of the crotch panel 406 includes a left portion 576 and a right portion 580. The left portion extends from an inner rear left side 588 of the left leg portion 408 laterally and outwardly to an inner longitudinal edge 596 of the rear left leg panel 464. For example, an inner longitudinal edge of the crotch panel 406 is coupled to an inner longitudinal edge of the front thigh panel 432. A lower lateral edge 604 is coupled to a laterally extending edge 612 of the rear left leg panel 464. For example, the lower lateral edge 604 of the crotch panel 406 and the laterally extending edge 612 of the rear left leg panel 464 are coupled at a position corresponding to an upper knee of the pilot when the flight suit 8 is worn. The left portion 576 of the crotch portion extends longitudinally along the length of an in-seam 582 of the lower portion 400 to an apex 620 of the in-seam 582 whereat the left portion 576 and the right portion 580 of the crotch panel meet. An upper portion of the crotch panel 406 corresponding to the meeting region of the left and right portions 576, 580 extend in a front to rear direction of the flight suit 8 between the front and rear of the lower portion 400. When the flight suit 8 is worn, the crotch panel 406 is located at a position corresponding to the crotch and inner thighs of the pilot.

The crotch panel 406 is extensible. A region of the crotch panel 406 proximate the apex of the in-seam of the lower portion 400 is extensible in a front-to-rear (and vice versa) direction represented by arrow 628. Regions of the crotch panel 406 extending longitudinally along the in-seam 582 of the lower portion 400 are extensible in a front-to-rear (and vice versa) direction and lateral direction represented by arrow 636. Accordingly, the crotch panel 406 is extensible in a direction generally transverse to the longitudinal axis defined by the left and right leg portions. According to one exemplary embodiment, the left and right portions of the crotch panel 406 are formed of a single piece of fabric.

The crotch panel 406 includes a stretch fabric that is extensible by at least 45% in a weft direction and by less than 40% in a warp direction, the weft direction being generally transverse to the longitudinal direction of the leg portions. For example, the whole of the crotch panel 406 may be formed of the stretch fabric. In some examples, the stretch fabric may be extensible by at least 50% in the weft direction and by less than 45% in the warp direction. In some examples, the stretch fabric may be extensible by at least 55% in the weft direction and by 40% or less in the warp direction.

According to various exemplary embodiments, the crotch panel 406 is formed of a fabric that is durable, resistant to abrasion and breathable. For example, the stretch fabric has a breaking strength of at least 1800 N in the warp direction and at least 1200 N in the weft direction according to the ISO 13934-1 standard. For example, the stretch fabric has an air-permeability of 50-150 l/m$^2$/s according to the EN ISO 9237 standard. For example, the stretch fabric has an abrasion-resistance of at least 30,000 T according to the ISO 12947-2 standard. Alternatively, the stretch fabric has an abrasion-resistance of at least 40,000 T according to the ISO 12947-2 standard. Alternatively, the stretch fabric has an abrasion-resistance of at least 50,000 T according to the ISO 12947-2 standard.

For example, the crotch panel 406 is formed of Schoeller—Dynamic™ fabric. The lower portion 400 further includes an extensible left knee panel 640. An upper lateral edge 648 of the knee panel is coupled to the lower lateral edge 440 of the front thigh panel 432. The left knee panel 640 extends laterally between the inseam 582 of the left leg and an outer side 664 of the left leg. For example, an inner longitudinal edge 672 of the left knee panel 640 is coupled to an inner longitudinal edge of the rear left leg panel 464 and an outer longitudinal edge 680 of the knee panel is coupled to an outer longitudinal edge 472 of the rear left leg panel 464. For example, the upper lateral edge 648 has a generally convex curvature having an apex located proximate a longitudinal center of the front of the left leg portion 408. A lower lateral edge 688 of the left knee panel 640 is coupled to upper lateral edges 682, 684 of a front lower leg panel. For example, the lower lateral edge 688 can include inner sub-edge 690 and outer sub-edge 692. For example, the inner sub-edge 690 can be inclined in the longitudinally direction towards the lower lateral edge 504 of the left leg portion 408 and the outer sub-edge 692 can be inclined in the longitudinally direction towards the lower lateral edge 504 and the sub-edges 690, 692 meet at a point 694 positioned proximate a center of the left leg portion 408. Accordingly, the length of the left knee panel 640 along the longitudinal direction of the left leg portion 408 is greatest proximate the center of the left leg portion 408. Accordingly, the left knee panel 640 is located generally on a front middle portion of the left leg portion 408, which corresponds to a left knee of the pilot when the flight suit 8 is worn.

The left knee panel 640 is extensible in a longitudinal direction of the left leg portion 408. For example, the left knee panel 640 will be stretched in this direction when the pilot moves their left knee in a manner that exerts a force in the longitudinal direction of the left leg portion 408, such as bending the pilot's leg at their knee. It will be appreciated that the extensible property of the left shoulder portion 196 facilitates various movements of the pilot.

The left knee panel 640 includes a stretch fabric that is extensible by at least 45% in a weft direction and less than 45% in a warp direction, the weft direction being generally aligned with the direction of the longitudinal axis defined by the leg portions. For example, the whole of the elbow panel 220 may be formed of the stretch fabric. In some examples, the stretch fabric may be extensible by at least 50% in the weft direction and by less than 45% in the warp direction. In some further examples, the stretch fabric may be extensible by at least 55% in the weft direction and by 40% or less in the warp direction.

According to various exemplary embodiments, the left knee panel 640 is formed of a fabric that is durable, resistant to abrasion and breathable. For example, the stretch fabric has a breaking strength of at least 1800 N in the warp direction and at least 1200 N in the weft direction according to the ISO 13934-1 standard. For example, the stretch fabric has an air-permeability of 50-150 l/m²/s according to the EN ISO 9237 standard. For example, the stretch fabric has an abrasion-resistance of at least 30,000 T according to the ISO 12947-2 standard. Alternatively, the stretch fabric has an abrasion-resistance of at least 40,000 T according to the ISO 12947-2 standard. Alternatively, the stretch fabric has an abrasion-resistance of at least 50,000 T according to the ISO 12947-2 standard.

For example, the left knee panel 640 is formed of Schoeller—Dynamic™ fabric.

According to various exemplary embodiments, the left knee panel 640 is appropriately sized and/or shaped so that it is in a non-stretched state when the pilot is in a sitting position. For example, the knee panel is in a non-stretched state when the pilot is in a sitting position taken in the cockpit of a helicopter. For example, in this sitting position, the pilot's knee is bent at an angle. For example, the larger distance between the upper lateral edge 648 and the lower edge 688 at a center of the left leg portion 408 allows the left knee panel 640 to remain non-stretched when the pilot is in a sitting position.

A lower front left leg panel of the left leg portion 408 includes an inner portion 700 and outer portion 708. For example, the lower front left leg panel is formed of a single piece of fabric. Alternatively, the inner portion 700 is a first panel and the outer portion 708 is a second panel that are coupled together to form the lower front left leg panel. Both the inner portion 700 and outer portion 708 may be formed of the primary material.

The inner portion 700 extends laterally from the inseam of the left leg portion 408 to a longitudinal inner edge 716 of the outer portion 708. An upper lateral edge of the inner portion 700 corresponds to sub-edge 682. A lower lateral edge 724 of the inner portion 700 is spaced apart from the lower lateral edge 504 of the left leg portion 408 in the longitudinal direction.

The outer portion 708 extends laterally from the outer side 664 of the left leg portion 408 to the inner longitudinal edge 716 of the inner portion 700. The outer portion 708 extends longitudinally from the lateral sub-edge 692 of the knee panel to the lower lateral edge 504 of the left leg portion 408. For example, the outer portion 708 has formed thereon a patch pocket 744.

The lower portion 400 further includes an extensible inner ankle panel 740. An upper lateral edge 748 of the inner ankle panel 740 is coupled to the lower lateral edge 724 of the first portion 700 of the lower front left leg panel. The inner ankle panel 740 extends laterally between the inseam 656 of the left leg portion 408 and the inner longitudinal edge 752 of the outer portion 708 of the lower front left leg panel. The inner ankle panel 740 further extends longitudinally from the upper lateral edge 748 to its lower lateral edge 732. The inner ankle panel 740 covers an inner region of the leg of the pilot when the flight suit 8 is worn. For example, the inner region extends from the ankle of the pilot up to at least one fifth of the height of the tibia of the pilot.

The inner ankle panel 740 is extensible in a lateral direction of the left leg portion 408. For example, the inner ankle panel 740 will be stretched in this direction when an item having a large width or diameter, such as a boot, is passed through the left leg portion 408. It will be appreciated that the extensible property of the inner ankle panel 740 facilitates the tasking of dressing the pilot in the suit. For example, the pilot need not remove their footwear, such as a boot, in order to put on the flight suit 8.

The inner ankle panel 740 includes a stretch fabric that is extensible by at least 45% in a weft direction and less than 45% in a warp direction, the weft direction being generally transverse to the direction of the longitudinal axis defined by the leg portions. For example, the whole of the crotch panel 406 may be formed of the stretch fabric. In some examples, the stretch fabric may be extensible by at least 50% in the weft direction and by less than 45% in the warp direction. In some further examples, the stretch fabric may be extensible by at least 55% in the weft direction and by 40% or less in the warp direction.

Figure 5:
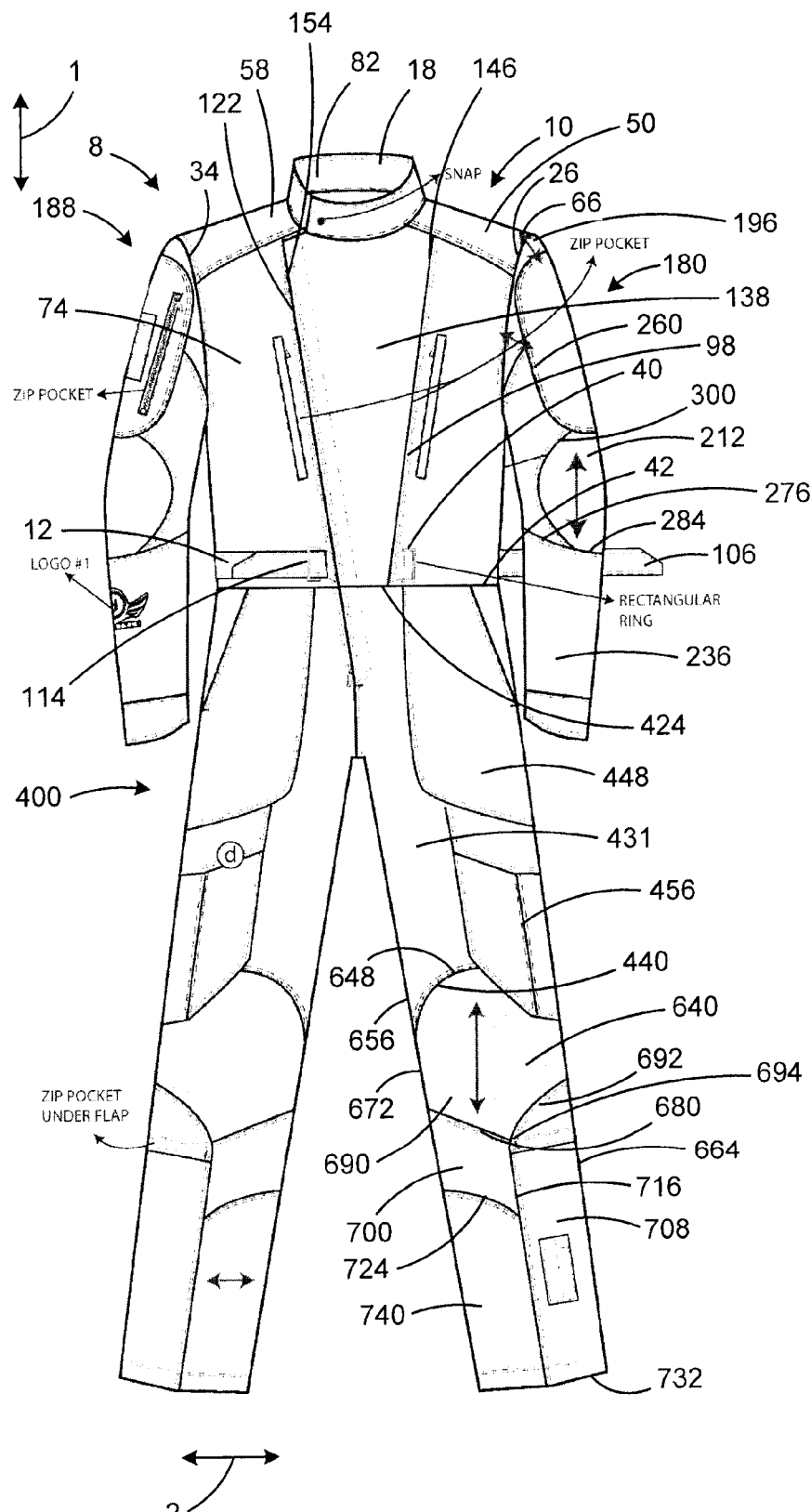
FIG. 5 illustrates a plan view of a front exterior of the helicopter suit according to various exemplary alternative embodiments.
Figure 6:
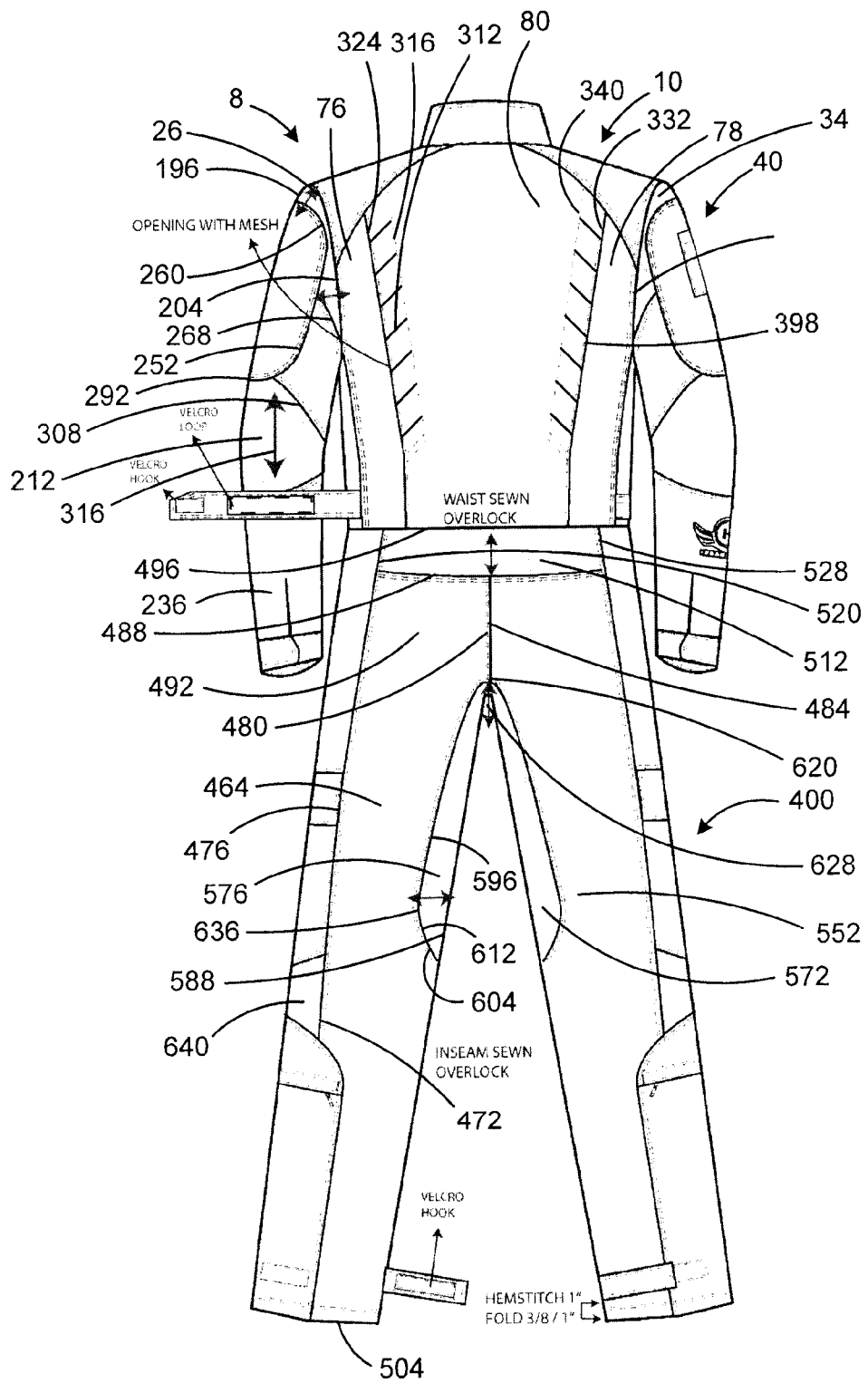
FIG. 6 illustrates a plan view of a rear exterior of the flight suit according to various exemplary alternative embodiments.

According to various exemplary embodiments, the inner ankle portion 740 is formed of a fabric that is durable, resistant to abrasion and breathable. For example, the stretch fabric has a breaking strength of at least 1800 N in the warp direction and at least 1200 N in the weft direction according to the ISO 13934-1 standard. For example, the stretch fabric has an air-permeability of 50-150 l/m²/s according to the EN ISO 9237 standard. For example, the stretch fabric has an abrasion-resistance of at least 30,000 T according to the ISO 12947-2 standard. Alternatively, the stretch fabric has an abrasion-resistance of at least 40,000 T according to the ISO 12947-2 standard. Alternatively, the stretch fabric has an abrasion-resistance of at least 50,000 T according to the ISO 12947-2 standard. For example, the inner ankle portion 740 is formed of Schoeller—Dynamic™ fabric Referring now to FIGS. 5 and 6, therein illustrated are a plan view of the front and a plan view of the rear respectively of a flight suit 8 according to an alternate exemplary embodiment. For example whereas the flight suit 8 illustrated in FIGS. 1 to 4 may be more suitable to be worn by female pilots, the alternate exemplary embodiment illustrated in FIGS. 5 and 6 is a flight suit suitable for male pilots. It will be understood that the alternate exemplary embodiment of FIGS. 5 and 6 share many elements of the flight suit described herein with respect to FIGS. 1 to 4, and reference numerals of FIGS. 1 and 2 are repeated in FIGS. 5 and 6 to indicate corresponding or analogous elements. In particular, one of the longitudinal edges of the center panel 138 and the longitudinal inner edge of one of the left breast panel 66 and the right breast panel 74 having the closure mechanisms extends past a waist edge 424 of the torso portion 10 and extends partly into the front of the lower portion 400. Accordingly, the opening exposed when the center panel 138 is detached from one of the left breast panel 66 and the right breast panel 74 is further enlarged, thereby further facilitating the pilot's task of putting on the flight suit 8.

Figure 7:
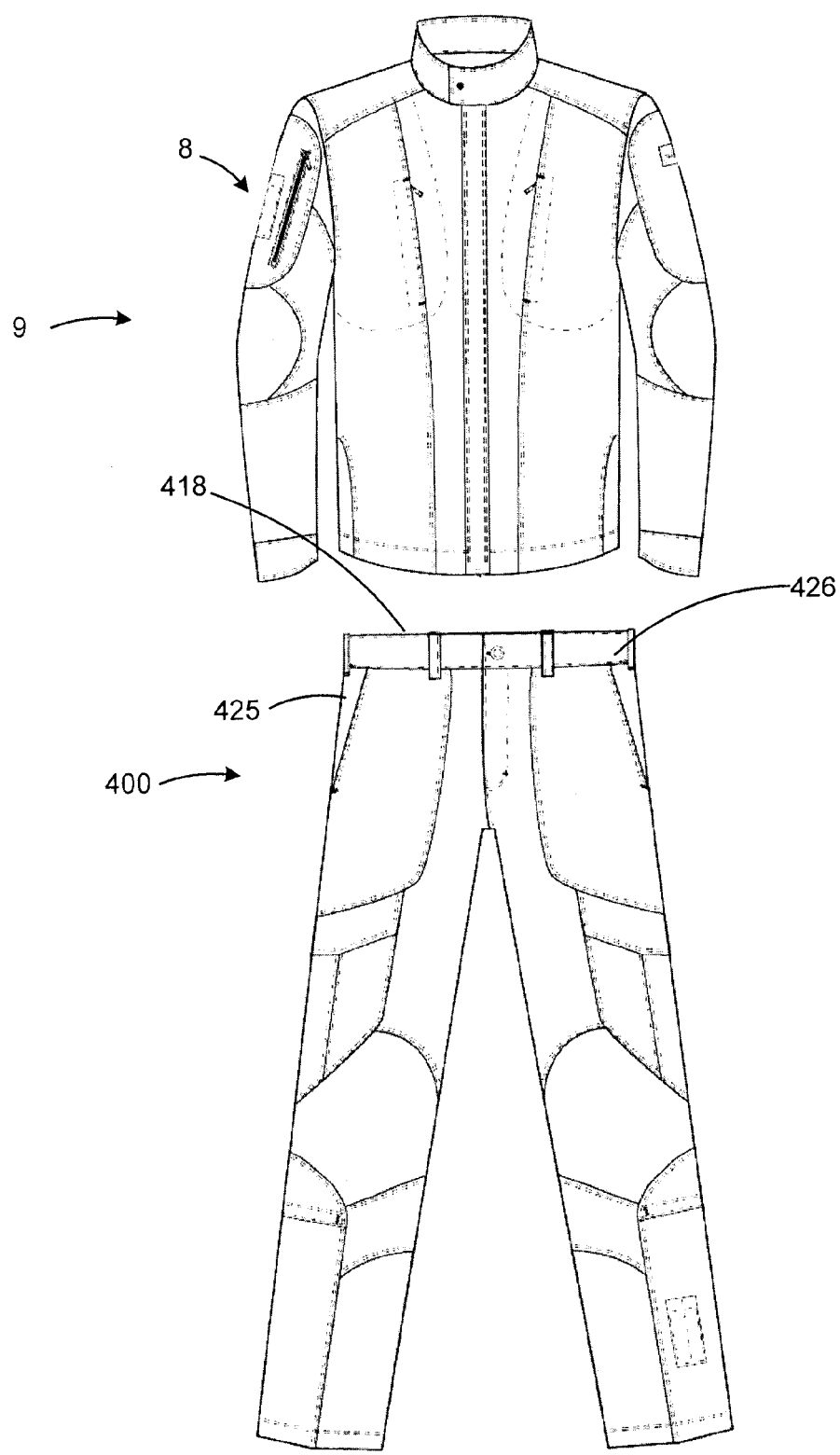
FIG. 7 illustrates plan view of a front exterior of a multi-piece flight suit according to various exemplary embodiments.
Figure 8:
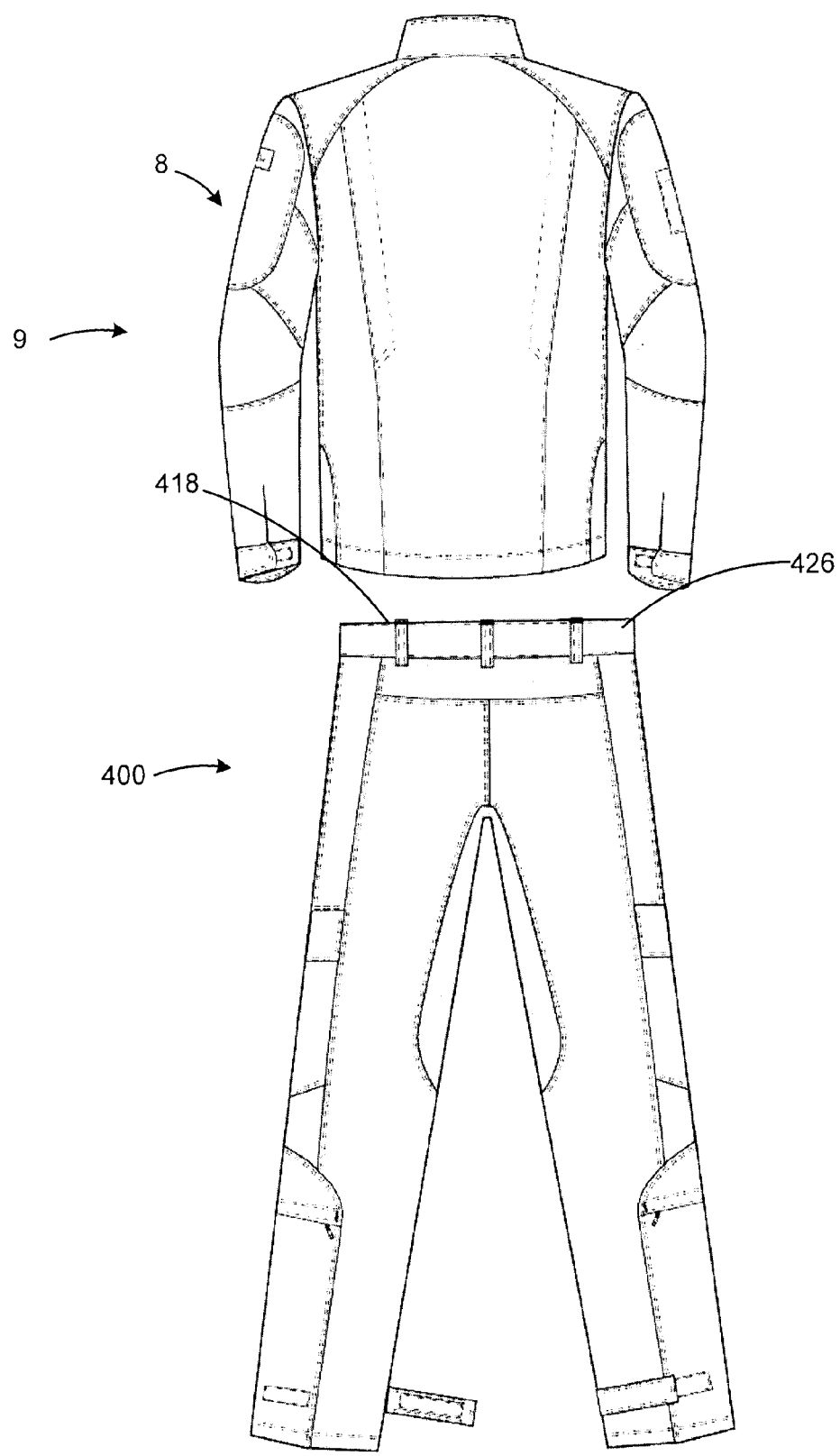
FIG. 8 illustrates a plan view of a rear exterior of a multi-piece flight suit according to various exemplary embodiments.
Figure 9:
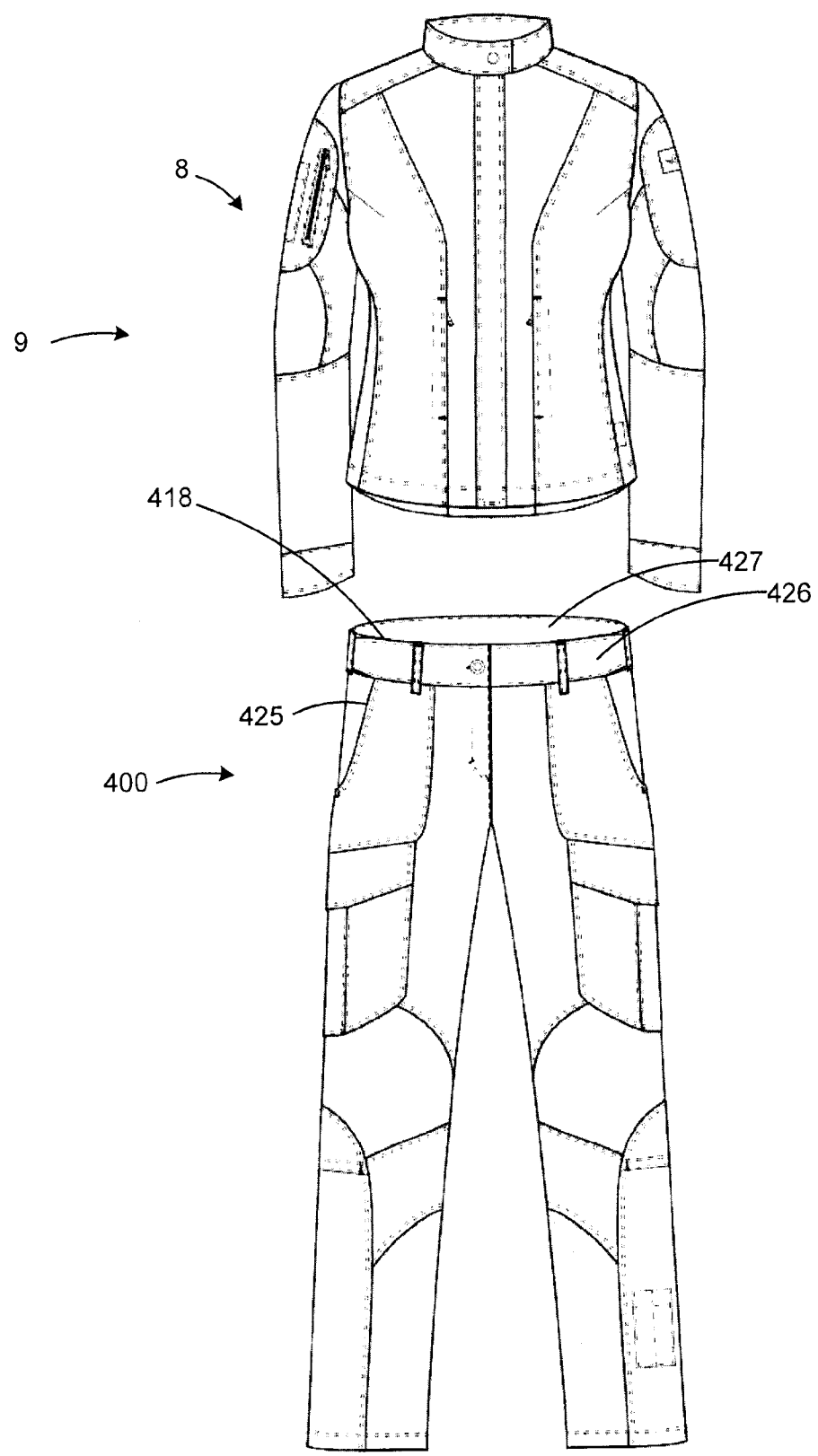
FIG. 9 illustrates a plan view of a front exterior of a multi-piece flight suit according to various exemplary embodiments.
Figure 10:
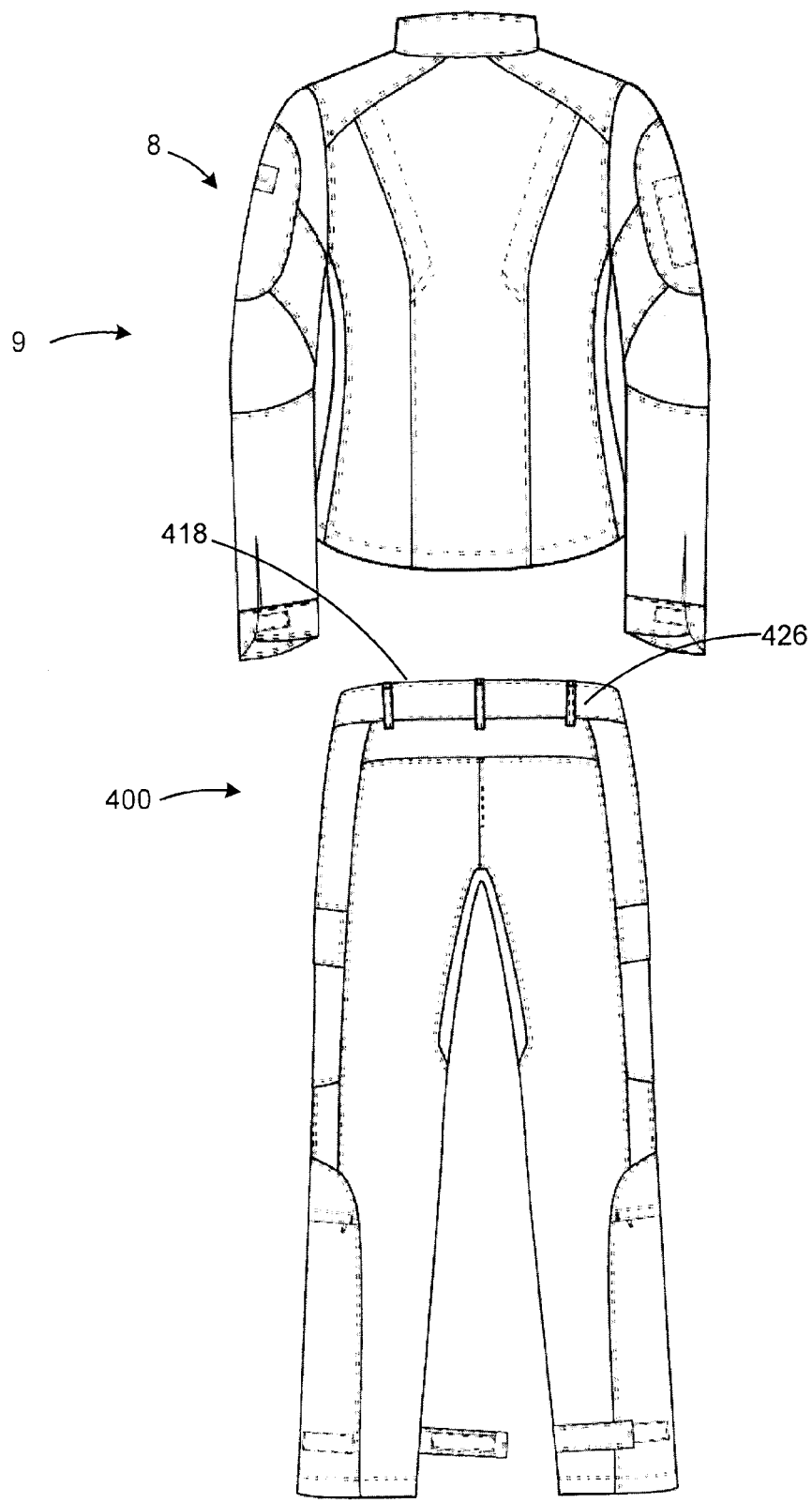
FIG. 10 illustrates a plan view of a rear exterior of a multi-piece flight suit according to various exemplary embodiments.

Referring now to FIGS. 7-10, therein illustrated are plan views of the front and the rear of a flight suit 8 according to various alternate exemplary embodiment. It will be understood that the alternate exemplary embodiment of FIGS. 7-10 share many elements of the flight suit described herein with respect to FIGS. 1 to 4, and reference numerals of FIGS. 1 and 2 are repeated in FIGS. 7-10 to indicate corresponding or analogous elements. For example, the flight suit 8 illustrated in FIGS. 7-10 are multi-piece pilot suits wherein the upper portion and the lower portion 400 are discrete pieces. For example, FIGS. 7 and 8 illustrate a flight suit 8 suitable to be worn by a male pilot. For example, FIGS. 9 and 10 illustrate a flight suit 8 suitable to be worn by a female pilot.

For example, in each of the exemplary embodiments of the flight suit 8 to be worn by a female pilot, the sides of the torso portion 10 are more fitted to more snugly fit about the torso of the female pilot than the sides of the torso portion 10 of the exemplary flight suit 8 to be worn by a male pilot.

It was found that the suits of the present disclosure were effective for providing comfort and mobility to the pilots. These suits were found to be comfortable, and not too rigid (particularly when worn in a sitting position). Moreover, the suits of the present disclosure offered comfort, durability, resistance and flexibility. For example, it was shown that the extensible portions were efficient since providing flexibility and comfort while not lowering the overall resistance and durability of the suit.

The person skilled in the art would understand that the various properties or features presented in a given embodiment can be added and/or used, when applicable, to any other embodiment covered by the general scope of the present disclosure.

The present disclosure has been described with regard to specific examples. The description was intended to help the understanding of the disclosure, rather than to limit its scope. It will be apparent to one skilled in the art that various modifications can be made to the disclosure without departing from the scope of the disclosure as described herein, and such modifications are intended to be covered by the present document.

The invention claimed is:

1. A flight suit comprising:
a torso portion defining two arm openings;
two shoulder portions that are effective for at least partially covering shoulder joint areas of a pilot, the shoulder portions being extensible, comprising each opposing first and second edges, and being each coupled to a different arm opening of the torso portion by means of their respective first edge, the two shoulder portions comprising each a stretch fabric that is extensible by at least 45% in a weft direction and by less than 45% in a warp direction, the weft direction being generally transverse to their respective first and second edges, the shoulder portions being in a non-stretched state when the pilot is in a sitting position;
two sleeves coupled each to a different shoulder portion by means of the second edge of their respective shoulder portion, each sleeve optionally comprising an extensible elbow panel; and
a lower portion comprising an extensible crotch portion and two leg portions, each leg portion comprising an extensible inner panel effective for covering an inner region of each leg of the pilot, the inner region adapted to extend from an ankle up to at least one fifth of the height of the tibia of the pilot, said extensible inner panels comprising each a stretch fabric that is extensible by at least 45% in a weft direction and by less than 45% in a warp direction, the weft direction being generally transverse to a longitudinal axis defined by each of the leg portions.

2. The flight suit of claim 1, wherein the stretch fabric of the two shoulder portions are extensible by at least 50% in a weft direction and by less than 45% in a warp direction.

3. The flight suit of claim 2, wherein the stretch fabric of the shoulder portions has an abrasion-resistance of at least 40,000 T according to the ISO 12947-2 standard.

4. The flight suit of claim 3, wherein the extensible crotch panel comprises a stretch fabric that is extensible by at least 50% in a weft direction and by less than 45% in a warp direction, the weft being generally transverse to the longitudinal axis defined by each of the leg portion.

5. The flight suit of claim 2, wherein the extensible crotch panel comprises a stretch fabric that is extensible by at least 55% in a weft direction and by 40% or less in a warp direction, the weft being generally transverse to the longitudinal axis defined by each of the leg portion.

6. The flight suit of claim 5, wherein the stretch fabric of the extensible crotch panel has an abrasion-resistance of at least 40,000 T according to the ISO 12947-2 standard.

7. The flight suit of claim 5, wherein each sleeve comprises the extensible elbow panel.

8. The flight suit of claim 7, wherein the extensible elbow panels comprise each a stretch fabric that is extensible by at least 45% in a weft direction and by less than 45% in a warp direction, the weft being generally aligned with a longitudinal axis defined by each sleeve.

9. The flight suit of claim 7, wherein the extensible elbow panels comprise each a stretch fabric that is extensible by at least 55% in a weft direction and by 40% or less in a warp direction, the weft being generally aligned with a longitudinal axis defined by each sleeve.

10. The flight suit of claim 9, wherein the stretch fabric of the extensible elbow panels has an abrasion-resistance of at least 40,000 T according to the ISO 12947-2 standard.

11. The flight suit of claim 5, wherein the weft direction of the stretch fabric of the extensible crotch panel is in a rear-front direction and/or in a lateral direction.

12. The flight suit of claim 1, wherein the stretch fabric of the two shoulder portions are extensible by at least 55% in a weft direction and by 40% or less in a warp direction.

13. The flight suit of claim 1, wherein the shoulder portions are each tubular and adapted to surround the shoulder joint areas of the pilot.

14. The flight suit of claim 1, wherein one of the shoulder portions is adapted to be stretched when a corresponding arm of the pilot exerts a force in a longitudinal direction of a corresponding sleeve.

15. The flight suit of claim 1, wherein each leg portion further comprises an extensible knee panel effective for covering a knee region of each leg of the pilot, each knee panel comprising a stretch fabric that is extensible by at least 45% in a weft direction and by no less than 45% in a warp direction, the weft direction being generally aligned with the longitudinal axis defined by each of the leg portions.

16. The flight suit of claim 15, wherein the extensible inner panels comprising each a stretch fabric that is extensible by at least 50% in a weft direction and by less than 45% in a warp direction, the weft direction being generally transverse to a longitudinal axis defined by each of the leg portions.

17. The flight suit of claim 1, further comprising a breathable interior lining extending over an interior surface of at least a rear portion of the torso portion.

18. The flight suit of claim 17, wherein the breathable interior lining extends about a left breast portion, rear portion and a right breast portion of the interior surface of the torso portion, a first longitudinal edge of the interior lining coupled to a first longitudinal edge of a center panel of the torso portion, a second longitudinal edge of the interior lining coupled to the second longitudinal edge of the center panel of the torso portion.

\* \* \* \* \*